(12) United States Patent
Shimura et al.

(10) Patent No.: US 12,730,532 B1
(45) Date of Patent: Sep. 8, 2026

(54) TOUCH IDENTIFICATION TECHNIQUE FOR TOUCH SENSING DEVICES

(71) Applicant: Synaptics Incorporated, San Jose, CA (US)

(72) Inventors: Hiroshi Shimura, Kanagawa (JP); Tomohiro Hirakawa, Chiba (JP); Takayuki Noto, Tokyo (JP); Shoji Fujita, Chiba (JP); Taku Yumoto, Saitama (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 19/074,802

(22) Filed: Mar. 10, 2025

(51) Int. Cl.
*G06F 3/041* (2006.01)
*G06F 3/044* (2006.01)

(52) U.S. Cl.
CPC ........ *G06F 3/04164* (2019.05); *G06F 3/0443* (2019.05)

(58) Field of Classification Search
CPC ........................... G06F 3/0443; G06F 3/04161
See application file for complete search history.

(56) References Cited

U.S. PATENT DOCUMENTS 10,222,912 B2* 3/2019 Hristov ................. G06F 3/0446
2017/0228062 A1 8/2017 Hristov et al.
2017/0315642 A1 11/2017 Yang et al.
2017/0343386 A1* 11/2017 Tanaka ............... G01R 27/2605
2023/0019284 A1 1/2023 Seger et al.
2023/0234444 A1 7/2023 Derichs et al.
2024/0010144 A1* 1/2024 Derichs ............. B60W 50/0098
2025/0004594 A1 1/2025 Shen et al.
2025/0021182 A1 1/2025 Kim

OTHER PUBLICATIONS

International Search Report, dated Jun. 19, 2026, in International Patent Application No. PCT/US2026/017852, filed Mar. 5, 2026.

* cited by examiner

*Primary Examiner* — Hang Lin
(74) *Attorney, Agent, or Firm* — Leydig, Voit & Mayer, Ltd.

(57) ABSTRACT

A system includes sensor electrodes, a touch controller, and a transmitter that provides a transmitter signal of a first frequency to an electrode capacitively coupled to a given object. The touch controller is configured to: generate a sensing signal that has a second frequency different from the first frequency during a touch sensing phase and has a DC waveform during a touch identification phase; generate touch sensing signal data based on the sensing signal with the second frequency and resulting signals received from the sensor electrodes during the touch sensing phase; sense a touch object based on the touch sensing signal data; generate touch identification signal data based on the sensing signal with the DC waveform and the resulting signals received from the sensor electrodes during the touch identification phase; and identify whether the sensed touch object is associated with the given object based on the touch identification signal data.

20 Claims, 17 Drawing Sheets

200
210 Display Panel
215
215
215
215
215
215
Touch Controller 240
TDDI 220
Display Driver 230
Positional Information
Touch Identification Information
Image Data
Host 500

215
215
215
215
215
215
Cb
210 Display Panel
220 TDDI
280 AFE Receiver
Q_EN
MIX_CLK_Q
340
I_EN
MIX_CLK_I
330
320b
310
Resulting Signal
320a
350
ADC
360
ADC_out
Sensing Signal
300

215
215
215
215
215
215
Cb
210 Display Panel
220 TDDI
Resulting Signal
Sensing Signal
$f_{sense}$
300
280 AFE Receiver
Q_EN(="0")
MIX_CLK_Q
I_EN(="1")
MIX_CLK_I
340
330
310
320a
350
ADC
360
ADC_out 215
215
215
400
$f_{Tx}$
Cf
145
140
Cb
210 Display Panel
220 TDDI
280 AFE Receiver
Q_EN(="0")
MIX_CLK_Q
340
I_EN(="1")
MIX_CLK_I
330
Resulting Signal
320a
310
350
ADC
360
ADC_out
Sensing Signal
$f_{sense}$
300

$f_{Tx}$
Cf
410
145
140
Cb
215 215 215
Cb
Cfs
420
210 Display Panel
220 TDDI
280-1 AFE Receiver
280-2 AFE Receiver
280-3 AFE Receiver
280-4 AFE Receiver
Q_EN
MIX_CLK_Q
I_EN
MIX_CLK_I
Modulation
340
330
310
350
ADC
360
ADC_out
300

Touch Sensing
Touch Identification
Overall Result
510
512
514
520
Location Match Detected
Driver
Not Driver (e.g., Passenger)
Not Driver (e.g., Passenger)

TOUCH IDENTIFICATION TECHNIQUE FOR TOUCH SENSING DEVICES

TECHNICAL FIELD

This disclosure relates generally to touch sensing and more particularly to touch identification techniques for touch sensing devices.

BACKGROUND

Input devices including touch sensing devices may be used in a variety of electronic systems. A touch sensing device may include a touch sensing region, demarked by a surface, in which the touch sensing device determines the presence, location, force and/or motion of one or more touch objects. Touch sensing devices may be used to provide interfaces for the electronic system. For example, touch sensing devices may be used as input devices for larger computing systems, such as touchpads integrated in, or peripheral to, notebook computers, desktop computers, automotive multimedia systems, or internet of things (IoT) devices. Touch sensing devices can also be used in smaller computing systems, such as touch screens integrated in cellular phones.

SUMMARY

This summary is provided to introduce, in a simplified form, a selection of concepts that will be further described below. This summary is not necessarily intended to identify key or essential features of the present disclosure. The present disclosure may include the following various aspects and embodiments.

In one aspect, the present disclosure provides a system comprising a plurality of sensor electrodes, a first transmitter, and a touch controller. The first transmitter is configured to provide a first transmitter signal of a first frequency to a first electrode capacitively coupled to a first object. The touch controller is configured to generate a sensing signal that has a second frequency different from the first frequency during a touch sensing phase and has a direct current (DC) waveform during a touch identification phase. The touch controller is further configured to generate touch sensing signal data based on the sensing signal with the second frequency and a plurality of resulting signals received from the plurality of sensor electrodes during the touch sensing phase, and sense one or more touch objects based on the touch sensing signal data. The touch controller is further configured to generate touch identification signal data based on the sensing signal with the DC waveform and the plurality of resulting signals received from the plurality of sensor electrodes during the touch identification phase, and to identify whether each of the one or more sensed touch objects is associated with the first object based on the touch identification signal data.

In another aspect, the present disclosure provides a touch controller for use in a system that comprises a transmitter. The transmitter is configured to provide a first transmitter signal of a first frequency to a first electrode capacitively coupled to a first object. The touch controller includes a sensing signal generator, an analog front end, and a processor. The sensing signal generator is configured to generate a sensing signal that has a second frequency different from the first frequency during a touch sensing phase and has a DC waveform during a touch identification phase. The analog front end is configured to generate touch sensing signal data based on the sensing signal with the second frequency and a plurality of resulting signals received from a plurality of sensor electrodes during the touch sensing phase, and to generate touch identification signal data based on the sensing signal with the DC waveform and the plurality of resulting signals received from the plurality of sensor electrodes during the touch identification phase. The processor is configured to sense one or more touch objects based on the touch sensing signal data, and to identify whether each of the one or more sensed touch objects is associated with the first object based on the touch identification signal data.

In still another aspect, the present disclosure provides a method for touch sensing. The method includes providing a transmitter signal of a first frequency to a first electrode capacitively coupled to a first object. The method further includes generating a sensing signal that has a second frequency different from the first frequency during a touch sensing phase and has a DC waveform during a touch identification phase. The method further includes generating touch sensing signal data based on the sensing signal with the second frequency and a plurality of resulting signals received from a plurality of sensor electrodes during the touch sensing phase. The method further includes sensing one or more touch objects based on the touch sensing signal data. The method further includes generating touch identification signal data based on the sensing signal with the DC waveform and the plurality of resulting signals received from the plurality of sensor electrodes during the touch identification phase. The method further includes identifying whether each of the one or more sensed touch objects is associated with the first object based on the touch identification signal data.

Other features and aspects are described in more detail below with reference to the attached drawings.

Figure 1:
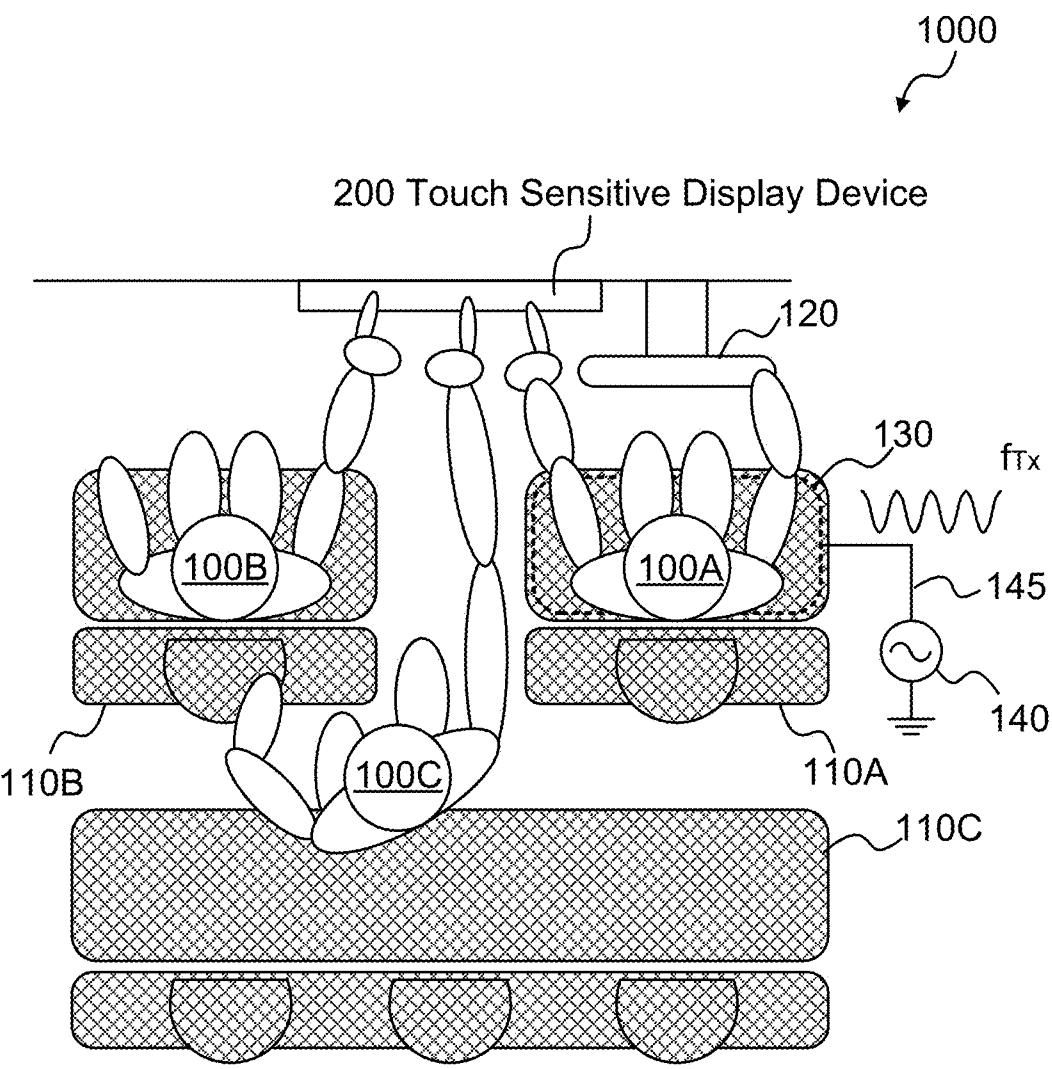
FIG. 1 shows an example environment in which a system adapted to touch sensing and identification technology is used in an automotive vehicle, according to one or more embodiments.

For ease of understanding, where possible, identical reference numerals have been used to designate elements that are common to the figures. It is contemplated that elements disclosed in one embodiment may be utilized in other embodiments without specific recitation. Suffixes may be appended to reference numerals to distinguish elements from one another. The drawings referenced herein are not to be construed as being drawn to scale unless specifically noted. In addition, the drawings are often simplified and details or components are omitted for clarity of presentation and explanation. The drawings and discussion are intended to illustrate the principles discussed below.

DETAILED DESCRIPTION

The following detailed description is exemplary in nature and is not intended to limit the disclosure or the applications and uses of the disclosure. Further, there is no intention to be bound by any expressed or implied theory presented in the preceding background, summary and brief description of the drawings, or in the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail so as not to unnecessarily complicating the description.

The term "coupled" as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Touch sensing is a technology used in input devices to detect a user input in a variety of electronic systems. Reference to touch sensing may encompass detecting the presence and position of a touch or the proximity of a touch object (e.g., a user's finger, a stylus or the like among others) within a touch sensing region. A touch sensing device may include a touch sensing region in which the touch sensing device determines the presence, position, force and/or motion of one or more touch objects. Touch sensing devices may be used to provide interfaces for the electronic system. For example, touch sensing devices may be used as input devices for larger computing systems, such as touchpads integrated in, or peripheral to, notebook computers, desktop computers, automotive multimedia systems, or internet of things (IoT) devices. Touch sensing devices may also be used in smaller computing systems, such as touch screens integrated in cellular phones. A touch sensing device may be integrated in a touch sensitive display device configured to detect user input on a display screen. In one implementation, a touch sensitive display device may include a display panel and an array of sensor electrodes disposed neighboring or integrated in the display panel. The touch sensitive display device may be configured to display an image on the display panel while sensing one or more input objects located on or near the display panel based on resulting signals received from the sensor electrodes.

In certain applications, it may be advantageous to identify the object that causes a touch in the touch sensing region. For example, in automotive applications, it may be desirable for a touch sensitive display device to be configured to distinguish a touch associated with the driver of an automotive vehicle (or the person sitting in the driver seat) from a touch associated with another person, such as a passenger of the automotive vehicle, and to operate based on whether a detected touch is associated with the driver. For example, in some implementations, the touch sensitive display device may desirably be configured to ignore touches associated with the driver for safety while the automotive vehicle is in motion. In other implementations, the touch sensitive display device may desirably be configured to ignore manual operations by a person other than the driver (e.g., a passenger) on navigation elements (e.g., icons, pull down menus, buttons, and the like) associated with driving. The present disclosure provides various technologies for achieving touch identification with improved reliability.

FIG. 1 shows an example environment 1000 in which a system adapted to touch sensing and identification technology is used in an automotive vehicle, according to one or more embodiments. It should be noted that the technologies disclosed in the present disclosure may also be used in other suitable environments. In the shown environment 1000, a driver 100A, who may be manipulating a steering wheel 120, is seated in a driver seat 110A while passengers 100B and 100C are seated in passenger seats 110B and 110C, respectively.

In the shown embodiment, a touch sensitive display device 200 is used to provide various information to the driver 100A and the passengers 100B and 100C and to receive inputs from the driver 100A and the passengers 100B and 100C. The touch sensitive display device 200 is configured to sense one or more touch objects in a touch sensing region defined on or near the display screen of the touch sensitive display device 200. In one or more embodiments, the touch sensitive display device 200 is adapted for capacitive touch sensing, which uses a set of sensor electrodes disposed in or near the display screen to sense one or more touch objects in the touch sensing region based on changes in capacitance of the sensor electrodes. In various embodiments, the touch sensitive display device 200 may be configured to sense a touch object based on absolute capacitance (or self-capacitance) sensing. In alternative embodiments, the touch sensitive display device 200 may be configured to sense a touch object based on transcapacitance (or mutual capacitance) sensing.

The touch sensitive display device 200 is further configured to identify whether each sensed touch object is associated with the driver 100A or an object other than the driver 100A (such as the passengers 100B and 100C). In one or more embodiments, the touch sensitive display device 200 is configured to achieve this identification by using a transmitter signal 145 applied to the driver 100A by a transmitter 140. In the shown embodiment, an electrode 130 is embedded in the driver seat 110A, and the transmitter signal 145 is applied to the driver 100A via the capacitive coupling between the electrode 130 and the driver 100A. In one implementation, the transmitter signal 145 may be a periodic signal (e.g., a sinusoidal signal) having a frequency of $f_{Tx}$, and the touch sensitive display device 200 may be configured to identify whether the sensed touch object is associated with the driver 100A based on components at the frequency $f_{Tx}$, (which may be referred to simply as $f_{Tx}$ components, hereinafter) of signals generated by the sensor electrodes.

Figure 2:
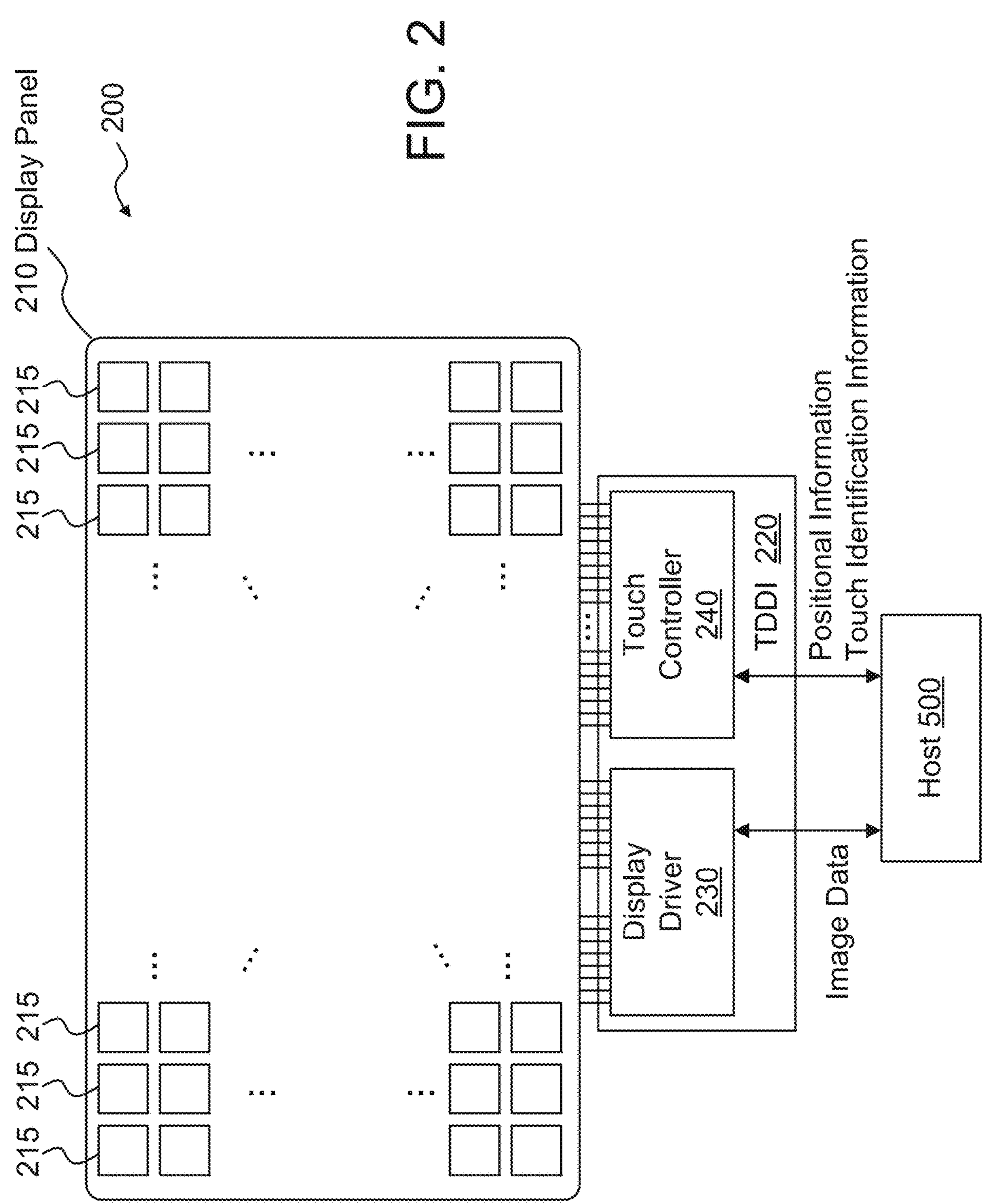
FIG. 2 shows an example configuration of a touch sensitive display device, according to one or more embodiments.

FIG. 2 shows an example configuration of the touch sensitive display device 200, according to one or more embodiments. In the shown embodiment, the touch sensitive display device 200 includes a display panel 210 used as a display screen and a touch and display driver integration (TDDI) 220. The display panel 210 may be a liquid crystal display (LCD) panel, an organic light emitting diode (OLED) display panel, a micro light emitting diode (μLED) display panel, or other display panels of suitable display technologies. In one implementation, the display panel 210 may include an array of pixels for display and an array of sensor electrodes 215 for touch sensing. In implementations where an LCD panel is used as the display panel 210, an array of counter electrodes (or common electrodes) of the display panel 210 may be used as the sensor electrodes 215. In other implementations, the sensor electrodes 215 may be disposed in a touch sensing panel that at least partially overlaps the display panel 210.

The TDDI 220 includes a display driver 230 and a touch controller 240. The display driver 230 is configured to drive the pixels of the display panel 210 based on image data received from a host 500. The touch controller 240 is configured to apply sensing signals to the sensor electrodes 215, and to apply signal processing to resulting signals received from the sensor electrodes 215 to achieve touch sensing. In one implementation, the sensing signals may be periodic voltage signals (e.g., rectangular voltage signals or sinusoidal voltage signals) and the resulting signals may be current signals depending on the capacitances of the sensor electrodes 215. In one implementation, when a touch object (which may be a finger of the driver 100A or the passenger 100B or 100C shown in FIG. 1) touches or comes into proximity with one or more sensor electrodes 215, a change in capacitance may occur at the one or more sensor electrodes 215, and the touch controller 240 may perform the touch sensing based on the change in capacitance. In one implementation, the touch controller 240 may be configured to generate positional information of each sensed touch object, which may indicate the position of that touch object. The term "positional information" may broadly include absolute position, relative position, velocity, acceleration, and other types of spatial information. The touch controller 240 may be further configured to identify whether each sensed touch object is associated with an object to which the transmitter signal 145 is applied (e.g., the driver 100A in the embodiment shown in FIG. 1), and to generate touch identification information which indicates the result of that identification. In one implementation, the touch identification information may indicate whether each sensed touch object is associated with the driver 100A. Details of the touch identification will be described in detail later.

Figure 3:
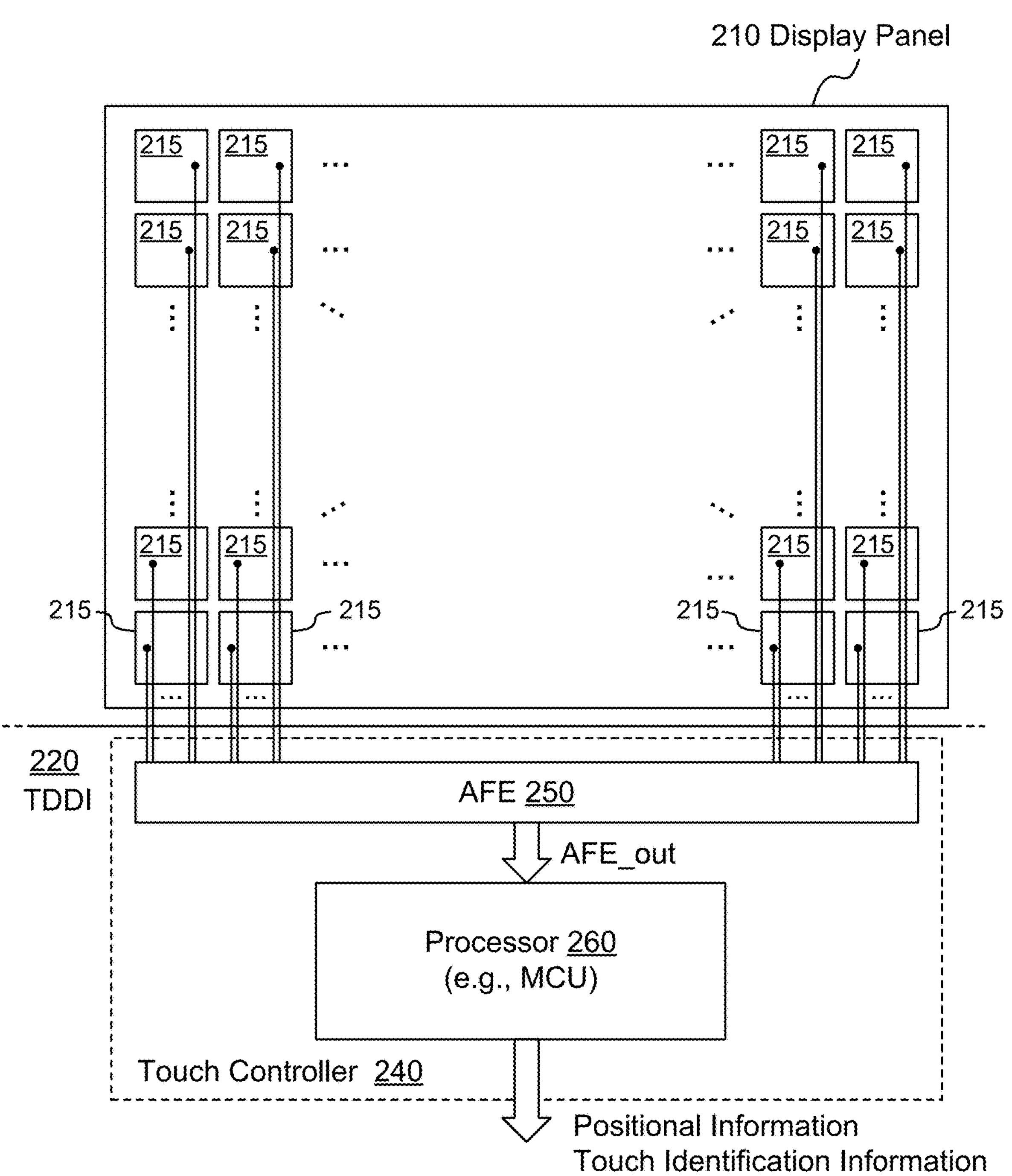
FIG. 3 shows an example configuration of a touch controller, according to one or more embodiments.

FIG. 3 shows an example configuration of the touch controller 240, according to one or more embodiments. In the shown embodiment, the touch controller 240 includes an analog front end (AFE) 250 and a processor 260. The AFE 250 is coupled to the respective sensor electrodes 215 in the display panel 210 and configured to apply sensing signals to the respective sensor electrodes 215. The AFE 250 is further configured to process the resulting signals received from the sensor electrodes 215 to generate AFE output data AFE_out, which includes capacitance information of the respective sensor electrodes 215. The processor 260 is configured to process the AFE output data AFE_out to generate the positional information and the touch identification information based on the AFE output data AFE_out. The processor 260 may be further configured to control the operation of the AFE 250 and other circuitry in the touch controller 240.

Figure 4:
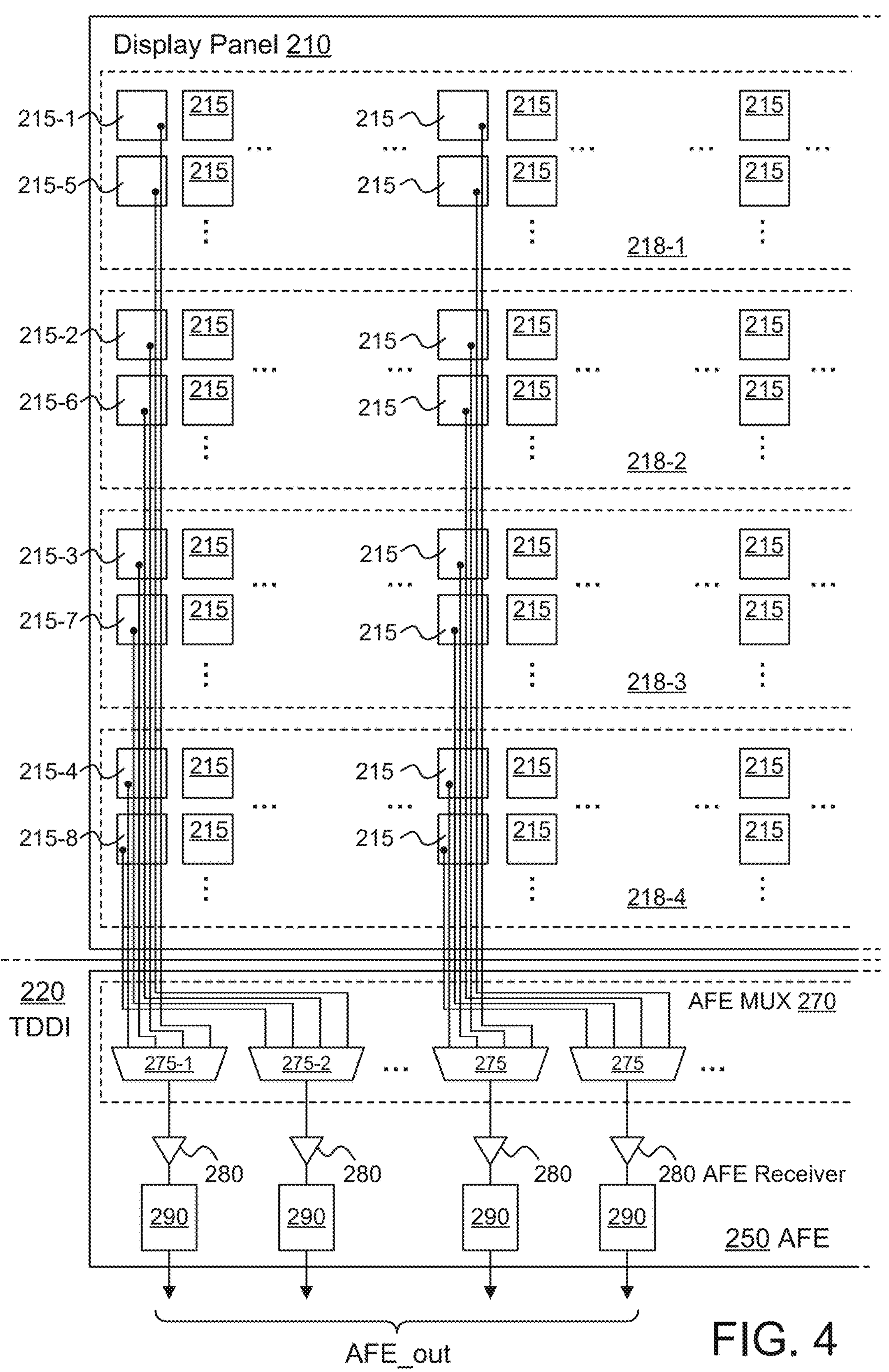
FIG. 4 shows an example configuration of an analog front end (AFE), according to one or more embodiments.

FIG. 4 shows an example configuration of the AFE 250, according to one or more embodiments. In the shown embodiment, the AFE 250 includes an AFE multiplexer (MUX) 270, a set of AFE receivers 280 and a set of digital signal processing circuits 290. The AFE multiplexer 270 is configured to select a set of sensor electrodes 215 from the array of sensor electrodes 215 and to electrically connect the selected set of sensor electrodes 215 to the AFE receivers 280. The AFE receivers 280 are configured to receives resulting signals from the selected set of sensor electrodes 215 and process the received resulting signals to generate digital outputs. The processing performed by the AFE receivers 280 may include, but is not limited to, signal integration, demodulation, analog-to-digital conversion, and other analog signal processing. The digital signal processing circuits 290 are configured to apply digital signal processing to the digital outputs of the AFE receivers 280 to generate the AFE output data AFE_out, which may include capacitance information of the respective sensor electrodes 215. The digital signal processing performed by the digital signal processing circuits 290 may include, but is not limited to, filtering, baseline management, and other digital processing.

In the shown embodiment, the sensor electrodes 215 of the sensor electrode array are grouped into first to fourth sensor electrode sets 218-1 to 218-4 arranged in a column. Meanwhile, the AFE multiplexer 270 includes a set of selectors 275 (four shown), each of which is coupled to four sensor electrodes 215 of the first to fourth sensor electrode sets 218-1 to 218-4, respectively. Each selector 275 is configured to select one of the corresponding four sensor electrodes 215 and to electrically connect the selected sensor electrode 215 to the corresponding AFE receiver 280. For example, a first selector 275-1 is coupled to four sensor electrodes: a first sensor electrode 215-1 of the first sensor electrode set 218-1, a second sensor electrode 215-2 of the second sensor electrode set 218-2, a third sensor electrode 215-3 of the third sensor electrode set 218-3, and a fourth sensor electrode 215-4 of the fourth sensor electrode set 218-4. The first selector 275-1 is configured to select one of these four sensor electrodes 215-1 to 215-4 and to electrically connect the selected sensor electrode to the corresponding AFE receiver 280. Correspondingly, a second selector 275-2 is coupled to four sensor electrodes: a fifth sensor electrode 215-5 of the first sensor electrode set 218-1, a sixth sensor electrode 215-6 of the second sensor electrode set 218-2, a seventh sensor electrode 215-7 of the third sensor electrode set 218-3, and an eighth sensor electrode 215-8 of the fourth sensor electrode set 218-4. The second selector 275-2 is configured to select one of these four sensor electrodes 215-5 to 215-8 and electrically to connect the selected sensor electrode to the corresponding AFE receiver 280.

Figure 5:
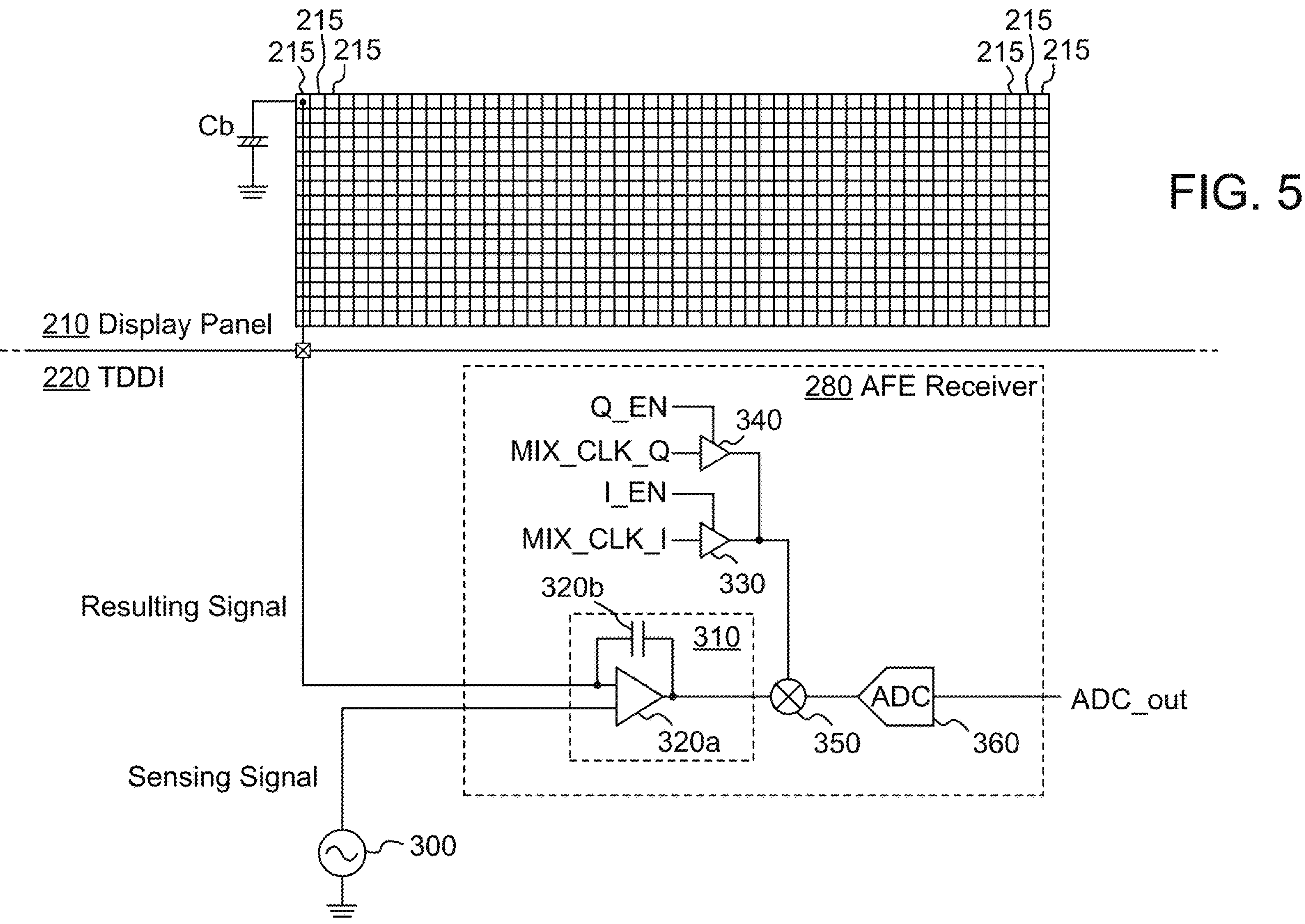
FIG. 5 shows an example configuration of an AFE receiver, according to one or more embodiments.

FIG. 5 shows an example configuration of an AFE receiver 280, according to one or more embodiments. It should be noted that the AFE multiplexer 270, which provides an electrical connection between the AFE receiver 280 and its corresponding senor electrode 215, is not shown in FIG. 5 for simplicity. The AFE receiver 280 has a first input configured to receive a sensing signal from a sensing signal generator 300 and a second input configured to receive a resulting signal from the sensor electrode 215 electrically connected to that AFE receiver 280, and is configured to generate a digital output ADC_out corresponding to the resulting signal. The sensing signal generator 300 is configured to change the waveform of the sensing signal depending on the operation phase (e.g., touch sensing, touch identification or the like) of the touch controller 240. The waveforms that the sensing signal generator 300 can generate include a periodic waveform (e.g., a rectangular waveform and a sinusoidal waveform) and a DC waveform. Details of controlling the waveforms of the sensing signal will be described later.

In the shown embodiment, the AFE receiver 280 includes an operational amplifier integrator 310, an in-phase (I) clock buffer 330, a quadrature (Q) clock buffer 340, a mixer 350, and an analog-to-digital converter (ADC) 360. The operational amplifier integrator 310 includes an operational amplifier 320*a* and a capacitor 320*b*. The operational amplifier 320*a* has a first input configured to receive the sensing signal from the sensing signal generator 300 and a second input configured to receive the resulting signal from the corresponding senor electrode 215. The capacitor 320*b* is coupled between the output of the operational amplifier 320*a* and the second input of the operational amplifier 320*a*, and thereby the integration of the resulting signal is generated at the output of the operational amplifier 320*a*.

The I clock buffer 330 and the Q clock buffer 340 form a clock supply circuit configured to provide a clock signal selected between an I clock signal MIX_CLK_I and a Q clock signal MIX_CLK_Q to the mixer 350. The I clock signal MIX_CLK_I has a reference phase defined with respect to the touch controller 240, and the Q clock signal MIX_CLK_Q has a quadrature phase that differs from the reference phase by 90 degrees (or $\pi/2$). It should be noted that a signal may be said to be "in-phase" when that signal has the reference phase, and that the sensing signal generated by the sensing signal generator 300 may be in-phase when the sensing signal is generated as a periodic signal. More specifically, the I clock buffer 330 is configured to provide the I clock signal MIX_CLK_I to the mixer 350 in response to the I clock enable signal I_EN being enabled, and the Q clock buffer 340 is configured to provide the Q clock signal MIX_CLK_Q to the mixer 350 in response to the Q clock enable signal Q_EN being enabled.

The mixer 350 is configured to mix the output signal of the operational amplifier integrator 310 with the clock signal received from the I clock buffer 330 or the Q clock buffer 340 to generate a demodulated signal for the sensor electrode 215 coupled to the AFE receiver 280. It should be noted that the clock signal provided to the mixer 350 is selected between the I clock signal MIX_CLK_I and the Q clock signal MIX_CLK_Q. Mixing the output signal of the operational amplifier integrator 310 with the I clock signal MIX_CLK_I results in the demodulated signal representing the I component of the resulting signal, while mixing the output signal of the operational amplifier integrator 310 with the Q clock signal MIX_CLK_Q results in the demodulated signal representing the Q component of the resulting signal. The demodulated signal is provided to the ADC 360. The ADC 360 is configured to perform analog-to-digital conversion on the demodulated signal received from the mixer 350 to generate the digital output ADC_out, representing the I or Q component of the resulting signal.

While FIG. 5 shows that the mixing with the clock signal is performed in the analog domain, the mixing with the I clock signal MIX_CLK_I or the Q clock signal MIX_CLK_Q may be performed in the digital domain. In such embodiments, the input of the ADC 360 may be coupled to the output of the operational amplifier integrator 310, and the digital signal processing circuit 290 (shown in FIG. 4) coupled to the output of the ADC 360 may be configured to mix the digital output ADC_out of the ADC 360 with the I clock signal MIX_CLK_I or the Q clock signal MIX_CLK_Q in the digital domain.

Figure 6:
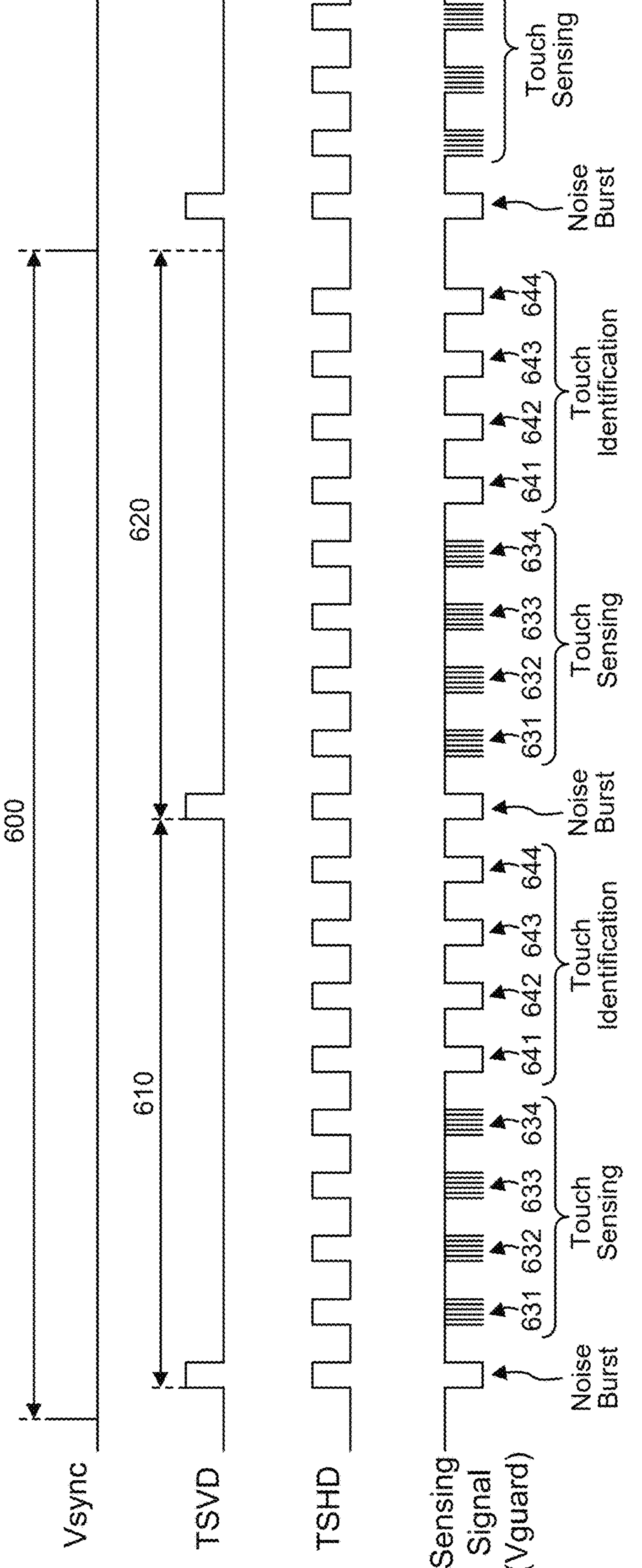
FIG. 6 is a timing diagram showing an example operation of a touch controller during a vertical synchronization period, according to one or more embodiments.

FIG. 6 is a timing diagram showing an example operation of the touch controller 240 during a vertical synchronization period 600, according to one or more embodiments. In FIG. 6, "Vsync" denotes a vertical synchronization signal defining the vertical synchronization period 600 and subsequent vertical synchronization periods and "TSVD" denotes a touch sensing frame synchronization signal. "TSHD" denotes a touch sensing enable signal. In one implementation, the AFE receivers 280 (shown in FIGS. 4 and 5) may be enabled to acquire the resulting signals from the array of sensor electrodes 215 in response to the touch sensing enable signal TSHD being enabled, and the sensing signal generator 300 may be configured to adjust the signal level and waveform of the sensing signal in response to the touch sensing enable signal TSHD. In one implementation, the sensing signal generator 300 may be configured to set the sensing signal to a constant voltage, referred to as the guard voltage Vguard, to prevent the AFE receivers 280 from receiving the resulting signals from the sensor electrodes 215 in response to the touch sensing enable signal TSHD being disabled (set to the "low" level in FIG. 6). The sensing signal generator 300 may further be configured to generate a periodic voltage signal or a DC voltage signal as the sensing signal in response to the touch sensing enable signal TSHD being enabled, depending on the operation phase of the touch controller 240.

In one or more embodiments, the transmitter 140 (shown in FIG. 1) continuously provides a periodic transmitter (Tx) signal having a frequency of $f_{Tx}$ to the electrode 130, which is capacitively coupled to the driver 100A. As discussed in more detail later, the touch controller 240 is configured to identify whether a sensed touch object is associated with an object to which the transmitter signal 145 is applied (e.g., the driver 100A in the embodiment shown in FIG. 1).

In the shown embodiments, the vertical synchronization period 600 includes two capacitance image frame periods 610 and 620, during each of which a capacitance image is generated with the array of sensor electrodes 215. In other embodiments, the vertical synchronization period 600 may include a single or three or more capacitance image frame periods.

Each of the capacitance image frame periods 610 and 620 includes a noise burst phase (indicated by "Noise Burst" in FIG. 6), a touch sensing phase (indicated by "Touch Sensing"), and a touch identification phase (indicated by "Touch Identification"). The noise burst phase is a phase during which the touch controller 240 selects the sensing frequency $f_{sense}$, which is the frequency of the sensing signal generated by the sensing signal generator 300 during the touch sensing phase. The sensing frequency $f_{sense}$ is also used as the frequency of the I clock signal MIX_CLK_I during the touch sensing phase to achieve capacitive sensing at the sensing frequency $f_{sense}$. In one implementation, the sensing signal generator 300 may be configured to provide a DC voltage (e.g., the ground level voltage) to each AFE receiver 280 during the noise burst phase, causing the sensor electrodes 215 to generate resulting signals affected by environmental noise. The AFE 250 may be configured to generate AFE output data AFE_out that represent environmental noise components, and the processor 260 may be configured to select, based on the AFE output data AFE_out, the frequency of the sensing signal to be used during the touch sensing phase to avoid the effect of the environmental noise. In one implementation, the touch controller 240 may select the frequency of the sensing signal to be used during the touch sensing phase from among a set of predetermined frequencies, which may include a first frequency $f_{sense1}$, a second frequency $f_{sense2}$, a third frequency $f_{sense3}$, and so on.

The touch sensing phase, which follows the noise burst phase, is a phase during which the touch controller 240 senses the presence of one or more touch objects based on the resulting signals received from the sensor electrodes 215 using the sensing signal of the sensing frequency $f_{sense}$. In one or more embodiments, the AFE 250 is configured to generate touch sensing signal data based on the resulting signals received from the sensor electrodes 215 during the touch sensing phase. In one implementation, the touch sensing signal data may include the full set of AFE output data AFE_out for the entire sensor electrode array generated from the resulting signals received from the respective sensor electrodes 215 during the touch sensing phase. The processor 260 is configured to sense one or more touch objects in the touch sensing region based on the touch sensing signal data. The processor 260 may be further configured to generate positional information of each sensed touch object based on the touch sensing signal data, which may indicate the position of that touch object.

The touch sensing phase may include a plurality of sensing subphases, during each of which the AFE 250 receives resulting signals from a respective set of sensor electrodes 215 and processes the received resulting signals to generate AFE output data AFE_out for that set of sensor electrodes 215. In one or more embodiments, the AFE multiplexer 270 may be configured to sequentially select a different set of sensor electrodes 215 during each sensing subphase, and the AFE 250 may be configured to sequentially process the resulting signals received from the selected set of sensor electrodes 215.

In implementations where the sensor electrodes 215 are grouped into the first to fourth sensor electrode sets 218-1 to 218-4 as shown in FIG. 4, the touch sensing phase may include four sensing subphases 631, 632, 633, and 634. During the first sensing subphase 631, the AFE multiplexer 270 may electrically connect the sensor electrodes 215 of the first sensor electrode set 218-1 to the AFE receivers 280 in the AFE 250, and the AFE 250 may process the resulting signals received from the first sensor electrode set 218-1 to generate AFE output data AFE_out for the first sensor electrode set 218-1. During the second sensing subphase 632, the AFE multiplexer 270 may electrically connect the sensor electrodes 215 of the second sensor electrode set 218-2 to the AFE receivers 280 in the AFE 250, and the AFE 250 may process the resulting signals received from the second sensor electrode set 218-2 to generate AFE output data AFE_out for the second sensor electrode set 218-2. During the third sensing subphase 633, the AFE multiplexer 270 may electrically connect the sensor electrodes 215 of the third sensor electrode set 218-3 to the AFE receivers 280 in the AFE 250, and the AFE 250 may process the resulting signals received from the third sensor electrode set 218-3 to generate AFE output data AFE_out for the third sensor electrode set 218-3. During the fourth sensing subphase 634, the AFE multiplexer 270 may electrically connect the sensor electrodes 215 of the fourth sensor electrode set 218-4 to the AFE receivers 280 in the AFE 250, and the AFE 250 may process the resulting signals received from the fourth sensor electrode set 218-4 to generate AFE output data AFE_out for the fourth sensor electrode set 218-4. The full set of AFE output data AFE_out for the entire sensor electrode array may be provided to the processor 260 and used as touch sensing signal data to sense one or more touch objects in the touch sensing region.

Figure 7A:
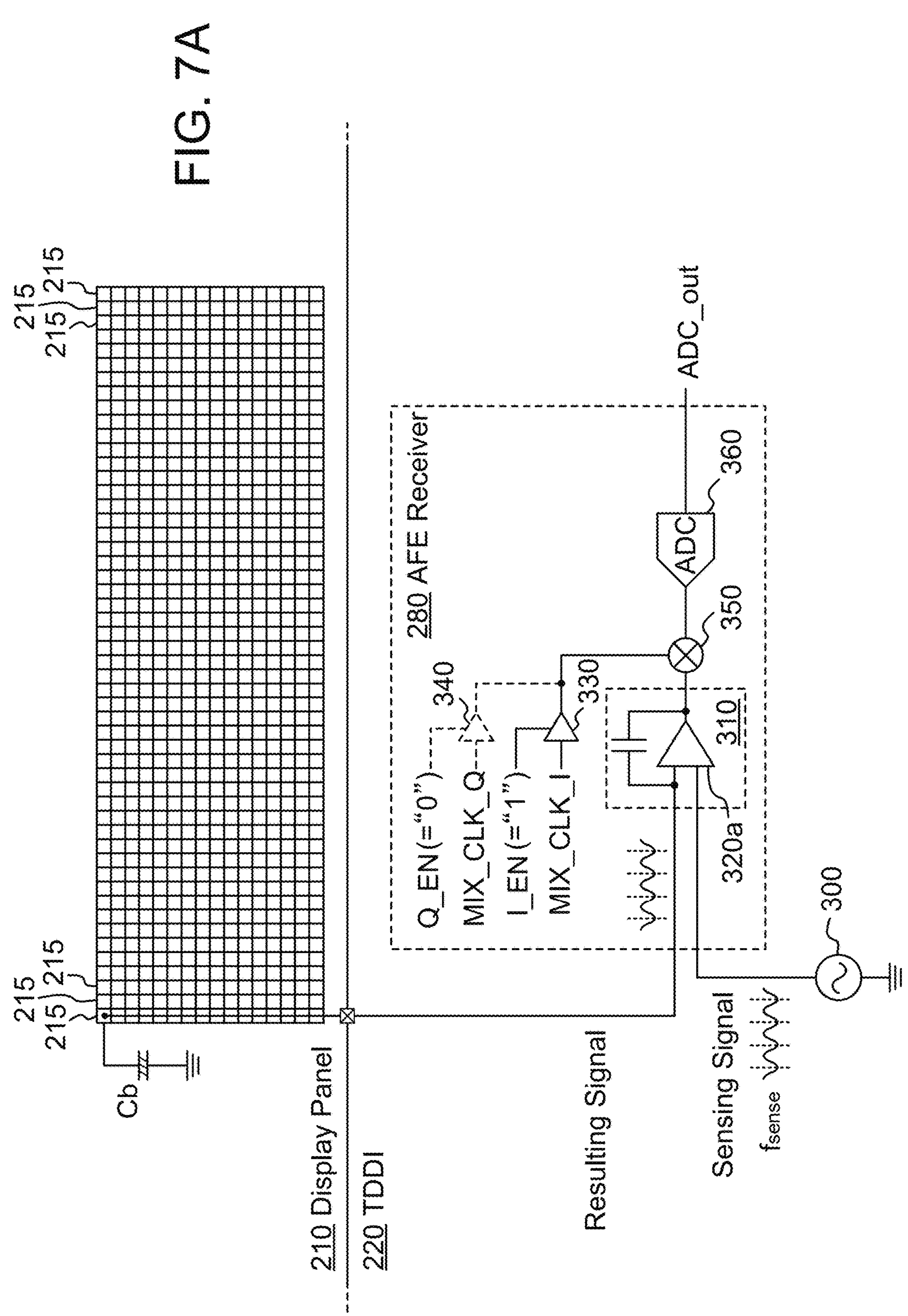
FIGS. 7A and 7B show example operations of AFE receivers and a sensing signal generator during a touch sensing phase, according to one or more embodiments.
Figure 7B:
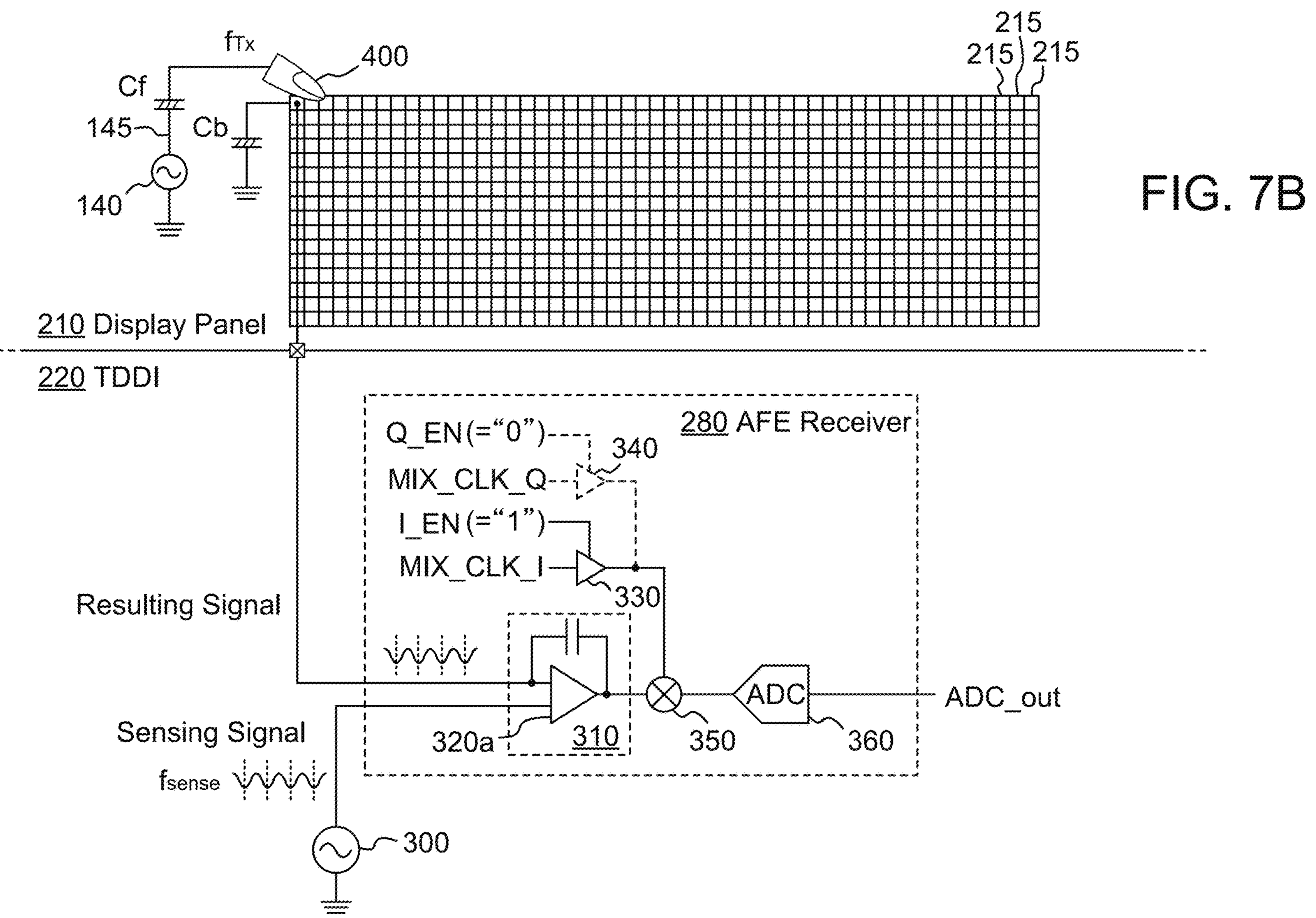

FIGS. 7A and 7B show example operations of the AFE receivers 280 (one of which is shown in FIGS. 7A and 7B) and the sensing signal generator 300 during the sensing subphases 631 to 634 of the touch sensing phase, according to one or more embodiments. FIG. 7A shows the case where no touch object is present, while FIG. 7B shows the case where a touch object 400 is located on or near the array of sensor electrodes 215. "Cb" in FIGS. 7A and 7B denotes the capacitance between each sensor electrode 215 and the system ground, while "Cf" in FIG. 7B denotes the capacitance between the electrode 130 and the driver 100A.

During the sensing subphases 631 to 634, the sensing signal generator 300 generates the sensing signal with a periodic waveform of the sensing frequency $f_{sense}$, which is selected during the noise burst phase as described above. The waveform of the sensing signal during the sensing subphases may be rectangular or sinusoidal. Since the inputs of the operational amplifier 320*a* are virtually shorted, the sensor electrodes 215 electrically connected to the AFE receivers 280 are driven with the sensing signal. Since the sensor electrodes 215 function as capacitance elements, the sensor electrodes 215 electrically connected to the AFE receivers 280 generate the resulting signals in the form of current signals having signal levels depending on the capacitances of the sensor electrodes 215.

Meanwhile, the frequency of the I clock signal MIX_CLK_I is adjusted to the sensing frequency $f_{sense}$ and the I clock enable signal I_EN is enabled during the touch sensing phase to allow the I clock buffer 330 to provide the I clock signal MIX_CLK_I to the mixer 350 in each AFE receiver 280. Accordingly, the AFE receivers 280 generate the digital outputs ADC_out to represent the I components of the resulting signals, and the AFE 250 outputs the AFE output data AFE_out to represent the I components of the resulting signals for the respective sensor electrodes 215. Accordingly, the touch sensing during the touch sensing phase is based on the I components of the resulting signals. The AFE output data AFE_out is provided to the processor 260 as the touch sensing signal data.

The processor 260 is configured to process the touch sensing signal data received from the AFE 250 and to thereby sense one or more touch objects located within the touch sensing region. The processor 260 is further configured to determine the position of each sensed touch object based on the touch sensing signal data.

Referring to FIG. 7B, when the touch object 400 is associated with the driver 100A (e.g., when the touch object 400 is a finger of the driver 100A), the resulting signals received from the sensor electrodes 215 may include frequency components around the frequency $f_{Tx}$ of the transmitter signal 145. Accordingly, if the frequency fix of the transmitter signal 145 is close to the sensing frequency $f_{sense}$ (i.e., the frequency of the sensing signal and the I clock signal MIX_CLK_I) or the frequencies of the harmonics of the sensing signal, this may cause unwanted noise in the resulting signals received from the sensor electrodes 215, potentially resulting in unreliable touch sensing. In one or more embodiments, to improve the accuracy of the touch sensing, the frequency fix of the transmitter signal 145 may be adjusted so that the frequency $f_{Tx}$ does not to fall within the frequency bands of the sensing signal and its harmonics to reduce the noise in the resulting signals received from the sensor electrodes 215.

Figure 8:
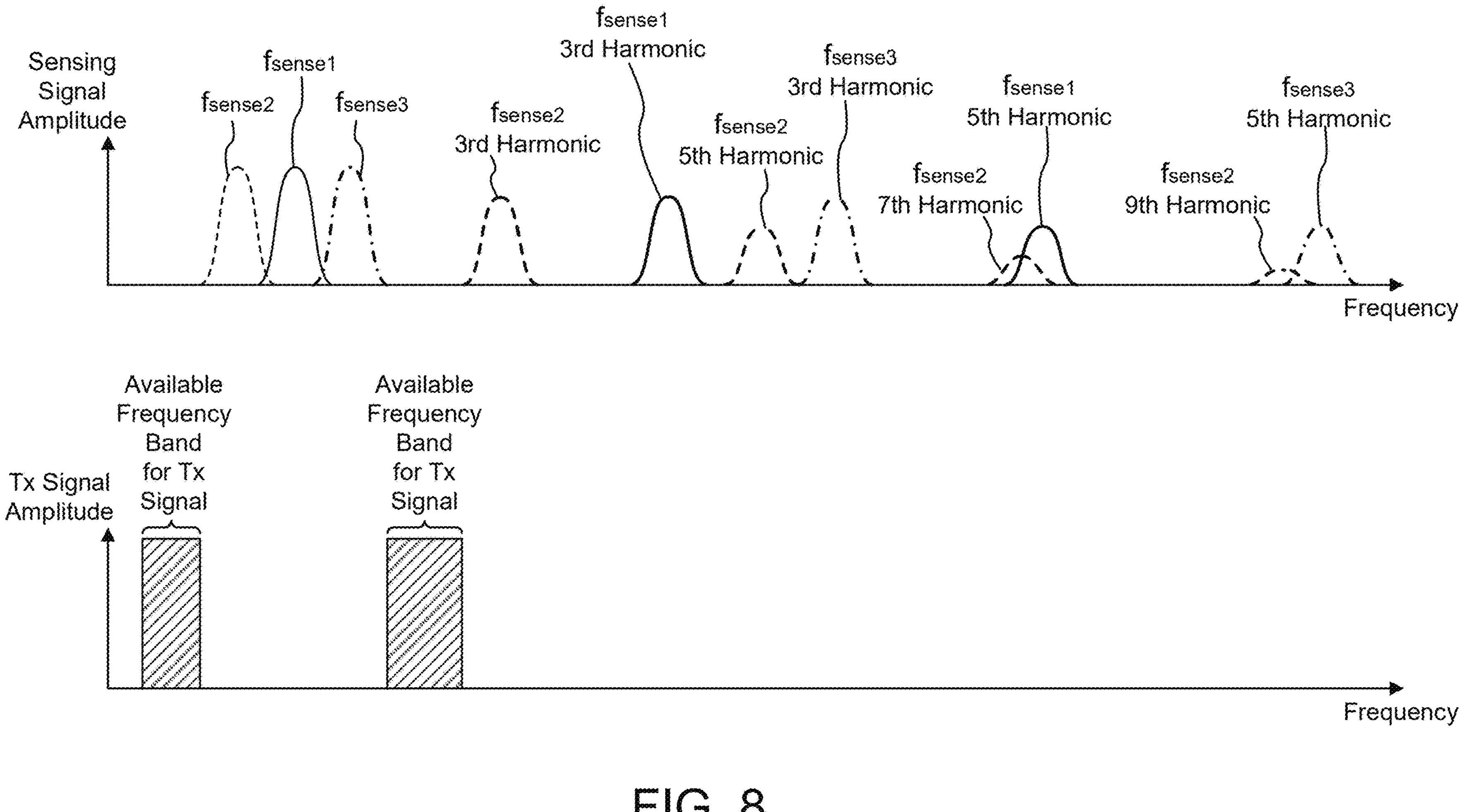
FIG. 8 is a frequency spectrum diagram showing possible frequency bands of a sensing signal and its harmonics, according to one or more embodiments.

FIG. 8 is a frequency spectrum diagram showing possible frequency bands of the sensing signal and its harmonics generated by the sensing signal generator 300, according to one or more embodiments. The shown embodiment assumes that the sensing signal is a rectangular periodic signal and that the sensing frequency $f_{sense}$ is selected from a set of frequencies $f_{sense1}$, $f_{sense2}$, and $f_{sense3}$. In FIG. 8, "$f_{sense1}$", "$f_{sense2}$", and "$f_{sense3}$" indicate the frequency bands of the sensing signal when the sensing frequency $f_{sense}$ is the frequencies $f_{sense1}$, $f_{sense2}$, and $f_{sense3}$, respectively;

"$f_{sense1}$ 3rd Harmonic" and "$f_{sense1}$ 5th Harmonic" indicate the frequency bands of the third and fifth harmonics of the sensing signal when the sensing frequency $f_{sense}$ is the frequency $f_{sense1}$;

"$f_{sense2}$ 3rd Harmonic", "$f_{sense2}$ 5th Harmonic", "$f_{sense2}$ 7th Harmonic", and "$f_{sense2}$ 9th Harmonic" indicate the frequency bands of the third, fifth, seventh, and ninth harmonics of the sensing signal when the sensing frequency $f_{sense}$ is the frequency $f_{sense2}$; and "$f_{sense3}$ 3rd Harmonic" and "$f_{sense3}$ 5th Harmonic" indicate the frequency bands of the third and fifth harmonics of the sensing signal when the sensing frequency $f_{sense}$ is the frequency $f_{sense3}$.

In one or more embodiments, the frequency fix of the transmitter signal 145 may be selected such that the frequency $f_{Tx}$ does not to fall within the possible frequency bands of the sensing signal and its harmonics even if any one of the frequencies $f_{sense1}$, $f_{sense2}$, and $f_{sense3}$ is selected as the frequency of the sensing signal. In the embodiment shown in FIG. 8, the frequency fix of the transmitter signal 145 may be selected in a frequency band lower than the frequency band of the sensing signal of the frequency $f_{sense2}$ or in a frequency band between the frequency band of the sensing signal for the frequency $f_{sense3}$ and the frequency band of the third harmonic of the sensing signal for the frequency $f_{sense2}$.

Referring again to FIG. 6, the touch identification phase is a phase during which the touch controller 240 identifies whether each of the one or more touch objects sensed during the touch sensing phase is associated with the touch object to which the transmitter signal 145 is applied (e.g., the driver 100A in the embodiment shown in FIG. 1). In one or more embodiments, the AFE 250 is configured to generate touch identification signal data based on the resulting signals received from the sensor electrodes 215 during the touch identification phase and the processor 260 is configured to identify, based on the touch identification signal data, whether each of the one or more touch objects is associated with the touch object to which the transmitter signal 145 is applied. In one implementation, the touch identification signal data may include the AFE output data AFE_out generated from the resulting signals received from the respective sensor electrodes 215 during the touch identification phase.

In some embodiments, the touch identification phase may include a plurality of identification subphases, during each of which the AFE 250 processes resulting signals received from a respective set of sensor electrodes 215 to generate AFE output data AFE_out for that set of sensor electrodes 215. In implementations where the sensor electrodes 215 are grouped into the first to fourth sensor electrode sets 218-1 to 218-4 as shown in FIG. 4, the touch identification phase may include four identification subphases 641, 642, 643, and 644. The AFE 250 may process the resulting signals from the first sensor electrode set 218-1 during the first identification subphase 641 to generate AFE output data AFE_out for the first sensor electrode set 218-1. Correspondingly, the AFE 250 may process the resulting signals from the second to fourth sensor electrode sets 218-2, 218-3, and 218-4 during the second, third, and fourth identification subphases 642, 643, and 644, respectively, to generate AFE output data AFE_out for the second to fourth sensor electrode sets 218-2, 218-3, and 218-4, respectively. The full set of AFE output data AFE_out for the entire sensor electrode array is provided to the processor 260 and used as the touch identification signal data. The processor 260 may process the touch identification signal data to identify whether each touch object sensed during the touch sensing phase is associated with the touch object to which the transmitter signal 145 is applied. Details of the touch identification are described later.

Figure 9:
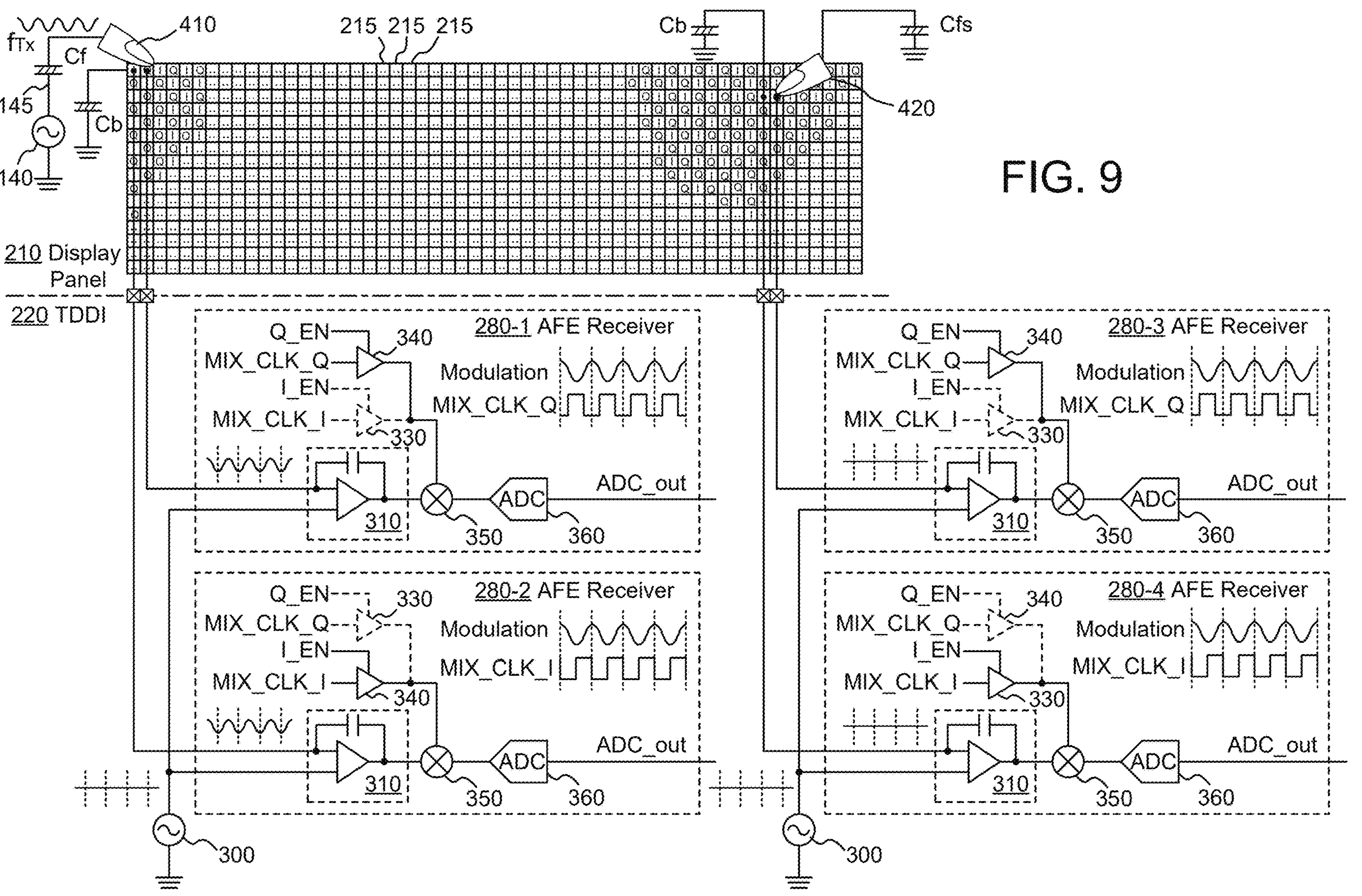
FIG. 9 shows example operations of AFE receivers and a sensing signal generator during a touch identification phase, according to one or more embodiments.

FIG. 9 shows example operations of the AFE receivers 280 (four shown) and the sensing signal generator 300 during the identification subphases 641 to 644 of the touch identification phase, according to one or more embodiments. Cb in FIG. 9 denotes the capacitance between each sensor electrode 215 and the system ground, Cf denotes the capacitance between the electrode 130 and the driver 100A, and Cfs denotes the capacitance between the system ground and a touch object (e.g., the passenger 100B or 100C) to which the transmitter signal 145 is not applied.

During the identification subphases 641 to 644, the AFE 250 causes the sensing signal generator 300 to generate the sensing signal with a DC waveform and to provide the generated sensing signal to the respective AFE receivers 280. Since the inputs of each operational amplifier integrator 310 are virtually shorted by its operational amplifier, the sensor electrodes 215 electrically connected to the AFE receivers 280 are driven with the DC sensing signal during the identification subphases 641 to 644.

The present disclosure recognizes that the transmitter signal 145 applied to the touch object by the transmitter 140 affects on the generation of the resulting signals on one or more sensor electrodes 215 located near the touch object, even when the sensor electrodes 215 are driven with the DC sensing signal. In one or more embodiments, the resulting signals received from one or more sensor electrodes 215 located near a touch object to which the transmitter signal 145 is applied (e.g., the driver 100A) include $f_{Tx}$ components (i.e., components at the frequency $f_{Tx}$), while the resulting signals received from sensor electrodes 215 located near a touch object to which the transmitter signal 145 is not applied are free of fix components. Accordingly, in one or more embodiments, the touch controller 240 is configured to detect $f_{Tx}$ components in the resulting signals received from the respective sensor electrodes 215 and to identify, based on the detected $f_{Tx}$ components, whether each touch object sensed during the touch sensing phase is associated with a touch object to which the transmitter signal 145 is applied (e.g., the driver 100A in the embodiment shown in FIG. 1).

More specifically, in one or more embodiments, the frequencies of the I clock signal MIX_CLK_I and the Q clock signal MIX_CLK_Q are adjusted to be equal to the frequency $f_{Tx}$ of the transmitter signal 145, while the AFE receivers 280 are configured to select the I clock signal MIX_CLK_I or the Q clock signal MIX_CLK_Q as the clock signal used by the mixers 350. As a result, the AFE receivers 280 are configured to generate digital outputs AFE_out such that the digital outputs AFE_out indicate the signal levels of the fix components of the resulting signals. For example, in the embodiment shown in FIG. 9, the AFE receivers 280-1 and 280-2 are electrically coupled to sensor electrodes 215 located near a touch object 410 to which the transmitter signal 145 is applied by the transmitter 140, and therefore the AFE receivers 280-1 and 280-2 generate their digital outputs AFE_out to indicate non-zero signal levels of the $f_{Tx}$ components. Meanwhile, the AFE receivers 280-3 and 280-4 are electrically coupled to sensor electrodes 215 located away from the touch object 410, and therefore the AFE receivers 280-3 and 280-4 generate their digital outputs AFE_out to indicate negligible signal levels of the $f_{Tx}$ components even though those sensor electrodes 215 are located near a touch object 420 to which the transmitter signal 145 is not applied. The AFE 250 is configured to process the digital outputs AFE_out by the digital signal processing circuit 290 to generate the touch identification signal data, which includes the AFE output data AFE_out generated during the touch identification phase.

The processor 260 is configured to identify, based on the touch identification signal data, whether each touch object sensed during the touch sensing phase is associated with an object to which the transmitter signal 145 is applied (e.g., the driver 100A in the embodiment shown in FIG. 1). More specifically, the processor 260 is configured to process the touch identification signal data to sense one or more touch objects. Because the touch identification signal data is generated based on the fix components of the resulting signals, only a touch object(s) associated with the object to which the transmitter signal 145, which has the frequency fix, is applied is sensed based on the touch identification signal data. The processor 260 is configured to identify that a touch object sensed during the touch sensing phase is associated with the object to which the transmitter signal 145 is applied (e.g., the driver 100A in the embodiment shown in FIG. 1) when that touch object is sensed also based on the touch identification signal data. In one or more embodiments, the processor 260 may be configured to determine the position(s) of the touch object(s) based on the touch identification signal data and to compare the determined position to the position of each touch object sensed based on the touch sensing signal data during the touch sensing phase. The processor 260 may be configured to identify that a touch object sensed during the touch sensing phase is associated with the object to which the transmitter signal 145 is applied if the position of the touch object sensed during the touch sensing phase matches the position of any touch object sensed based on the touch identification signal data.

In one or more embodiments, the transmitter 140 may generate and provide the transmitter signal 145 to the electrode 130 asynchronously with the operation of the touch controller 240 in some embodiments. The generated transmitter signal 145 may be asynchronous with the I clock signal MIX_CLK_I and the Q clock signal MIX_CLK_Q, at least during the touch identification phase. In some embodiments, the transmitter signal 145 generated by the transmitter 140 may be asynchronous with the I clock signal MIX_CLK_I and the Q clock signal MIX_CLK_Q continuously during operation. This reduces or eliminates the need to control the phase of the transmitter signal 145, thereby simplifying system configuration.

On the other hand, in implementations where the transmitter signal 145 is generated asynchronously with the I clock signal MIX_CLK_I and the Q clock signal MIX_CLK_Q, the asynchronous generation of the transmitter signal 145 may make it unknown whether the effect of the transmitter signal 145 appears in the I or Q components of the resulting signals. To address this issue, in one or more embodiments, a first portion of the touch identification signal data may be generated based on the I components of the resulting signals for some of the sensor electrodes 215, while a second portion of the touch identification signal data may be generated based on the Q components for the other sensor electrodes. This may effectively allow the touch controller 240 to reliably detect the effect of the transmitter signal 145 on the resulting signals.

More specifically, the resulting signals provided to the AFE receivers 280 that select the I clock signal MIX_CLK_I may be integrated and then mixed with the I clock signal MIX_CLK_I to allow those AFE receivers 280 to generate the digital outputs ADC_out that represent the I components of those resulting signals. The resulting signals provided to the AFE receivers 280 that select the Q clock signal MIX_CLK_Q may be integrated and then mixed with the Q clock signal MIX_CLK_Q to allow those AFE receivers 280 to generate the digital outputs ADC_out that represent the Q components of those resulting signals. In the embodiment shown in FIG. 9, the AFE receivers 280-2 and 280-4 are configured to select the I clock signal MIX_CLK_I during the touch identification phase and the AFE receivers 280-1 and 280-3 are configured to select the Q clock signal MIX_CLK_Q during the touch identification phase. The AFE 250 may be configured to process the digital outputs ADC_out of the respective AFE receivers 280 to generate the touch identification signal data to represent the I components of the resulting signals received from some of the sensor electrodes 215 and the Q components of the resulting signals received from the others of the sensor electrodes 215.

Figure 10:
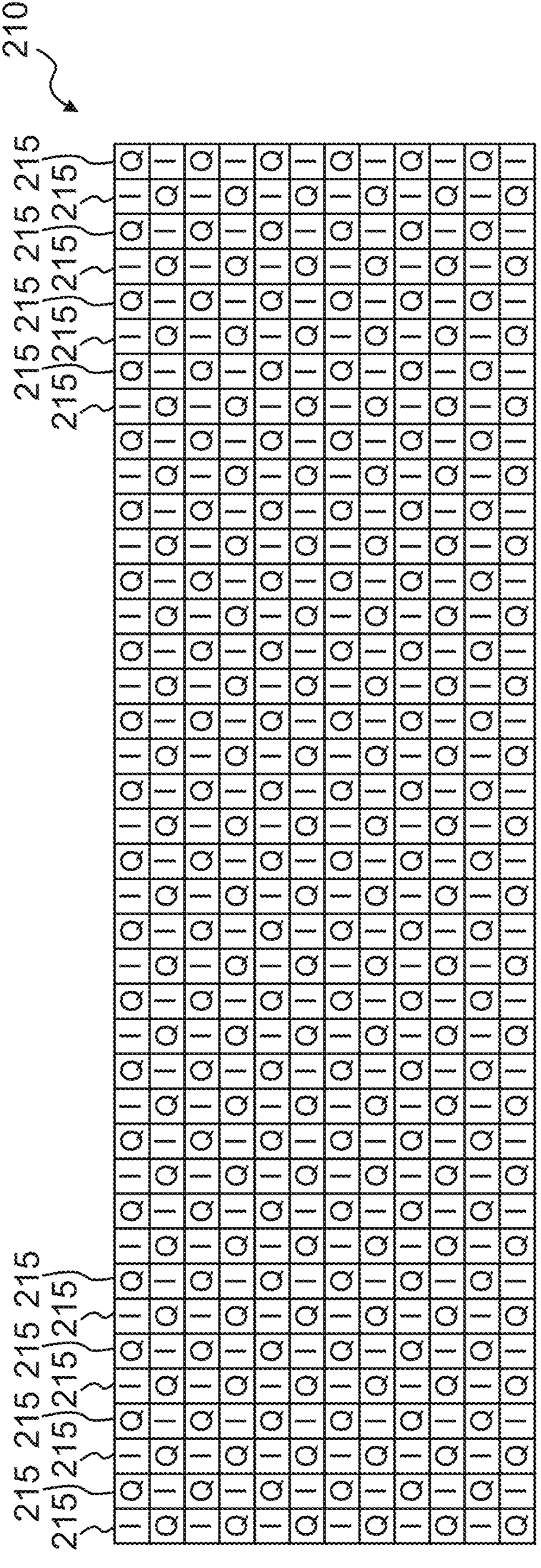
FIG. 10 is a diagram showing an example of selection between in-phase (I) and quadrature-phase (Q) clock signals for sensor electrodes during a touch identification phase, according to one or more embodiments.

FIG. 10 is a diagram showing an example of the selection between the I clock signal MIX_CLK_I or the Q clock signal MIX_CLK_Q for the resulting signals received from the respective sensor electrodes 215 during the touch identification phase, according to one or more embodiments. In FIG. 10, each "I" indicates a sensor electrode 215 that provides a resulting signal to be integrated and mixed with the I clock signal MIX_CLK_I, which may be referred to hereinafter as the "I sensor electrode", and each "Q" indicates a sensor electrode 215 that provides a resulting signal to be integrated and mixed with the Q clock signal MIX_CLK_Q, which may be referred to hereinafter as the "Q sensor electrode". In one or more embodiments, half of the sensor electrodes 215 may be used as I sensor electrodes during the touch identification phase, and the other half of the sensor electrodes 215 may be used as Q sensor electrodes during the touch identification phase. In the shown embodiment, the I sensor electrodes and the Q sensor electrodes are arranged in a checkered pattern, in which one of two sensor electrodes 215 adjacent in the vertical or horizontal direction is an I sensor electrode and the other is a Q sensor electrode. The arrangement of the I and Q sensor electrodes can be varied. In other embodiments, rows of I sensor electrodes and rows of Q sensor electrodes may be alternately arranged in the vertical direction of the display panel 210. In still other embodiments, columns of I sensor electrodes and columns of Q sensor electrodes may be alternately arranged in the horizontal direction of the display panel 210.

Figure 11:
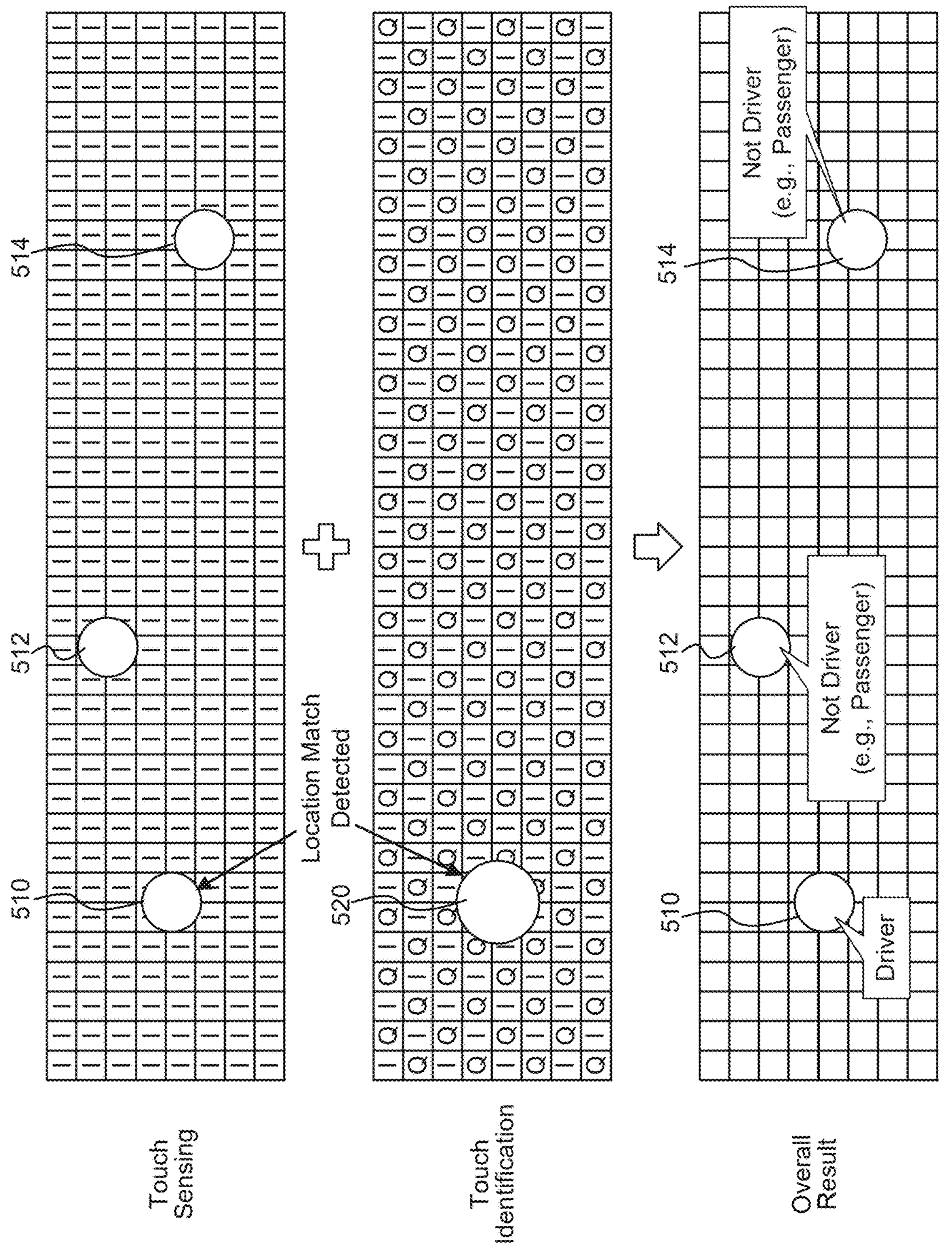
FIG. 11 shows an example procedure performed in a capacitance image frame period, according to one or more embodiments.

FIG. 11 shows an example procedure performed in a capacitance image frame period during which the touch controller 240 senses touch objects and identifies whether each sensed touch object is associated with an object to which the transmitter signal 145 is applied (e.g., the driver 100A in the embodiment shown in FIG. 1), according to one or more embodiments. As described above, each capacitance image frame includes a touch sensing phase and a touch identification phase.

During the touch sensing phase, one or more touch objects, denoted by numerals 510, 512, and 514, are sensed based on the resulting signals received from the sensor electrodes 215 while the sensing signal of a periodic waveform at the sensing frequency $f_{sense}$ is provided to the AFE receivers 280. Although three sensed touch objects are shown in FIG. 11, more or less than three touch objects may be sensed during the touch sensing phase. More specifically, the AFE 250 integrates the resulting signals and mixes the integrated resulting signals with the I clock signal MIX_CLK_I by the AFE receivers 280 (this is indicated by the boxes labeled by "I" in the top part of FIG. 11). The AFE 250 further generates the touch sensing signal data based on the I components of the resulting signals. The processor 260 processes the touch sensing signal data to sense the touch objects 510, 512, and 514. The processor 260 further determines the positions of the touch objects 510, 512, and 514 based on the touch sensing signal data.

During the touch identification phase, a touch object, denoted by numeral 520, is sensed while the sensing signal of a DC waveform is provided to the AFE receivers 280. As discussed above, providing the sensing signal of the DC waveform causes the touch controller 240 to sense only a touch object(s) associated with an object to which the transmitter signal 145 is applied. Although one sensed touch object is shown in FIG. 11, more than one touch object may be sensed during the touch identification phase.

More specifically, the AFE 250 integrates the resulting signals and mixes the integrated resulting signals with the I clock signal MIX_CLK_I or the Q clock signal MIX_CLK_Q by the AFE receivers 280. In the middle part if FIG. 11, the I sensor electrodes (which generate the resulting signals mixed with the I clock signal MIX_CLK_I) are indicated by the boxes labeled by "I", and the Q sensor electrodes (which generate the resulting signals mixed with the Q clock signal MIX_CLK_Q) are indicated by the boxes labeled by "Q". The AFE 250 further generates the touch identification signal data based on the I components of the resulting signals received from the I sensor electrodes and the Q components of the resulting signals received from the Q sensor electrodes.

The processor 260 identifies, based on the touch identification signal data, whether each of the touch objects 510, 512, and 514 sensed during the touch sensing phase is associated with the object to which the transmitter signal 145 is applied (e.g., the driver 100A in the embodiment shown in FIG. 1). In the embodiment shown in FIG. 11, the processor 260 compares the position of the touch object 520 determined based on the touch identification signal data with the positions of the touch objects 510, 512, and 514 sensed during the touch sensing phase. The processor 260 identifies that the touch object 510 is associated with the object to which the transmitter signal 145 is applied (e.g., the driver 100A in the embodiment shown in FIG. 1) because the position of the touch object 510 sensed during the touch sensing phase matches the position of the touch object 520 sensed based on the touch identification signal data. The processor 260 further identifies that the touch objects 512 and 514 are not associated with the object to which the transmitter signal 145 is applied, because the positions of the touch objects 512 and 514 sensed during the touch sensing phase do not match the position of the touch object 520 sensed based on the touch identification signal data.

After the touch identification, the processor 260 may generate positional information and touch identification information for the touch objects 510, 512, and 514 sensed during the touch sensing phase. The positional information may indicate the positions of the touch objects 510, 512, and 514. The touch identification information may indicate whether each of the touch objects 510, 512, and 514 is associated with the object to which the transmitter signal 145 is applied (e.g., the driver 100A in the embodiment shown in FIG. 1). An example of the overall result of the touch identification is shown in the bottom part of FIG. 11.

In one or more embodiments, the touch controller 240 may be configured to use the touch identification signal data only for the touch identification while generating the positional information of the touch objects 510, 512, and 514 based on the touch sensing signal data acquired during the touch sensing phase, without relying on the touch identification signal data acquired during the touch identification phase. This may effectively improve the accuracy of the positional information. The resolution of position determination based on the touch identification signal data acquired during the touch identification phase may be lower than that of position determination based on the touch sensing signal data acquired during the touch sensing phase, because the resolution of position determination depends on the distance between adjacent two I sensor electrodes and the distance between adjacent two Q sensor electrodes. For example, the checkered arrangement of the I sensor electrodes and the Q sensor electrodes shown in FIG. 10 may reduce the position determination resolution to one half of the case where all the sensor electrodes 215 are used as the I sensor electrodes. Accordingly, excluding the touch identification signal data from the generation of the positional information of each sensed touch object may effectively improve the accuracy of the positional information.

The processor 260 may send the positional information and touch identification information to the host 500 as shown in FIG. 2. The host 500 may cause the touch sensitive display device 200 to display an image responsive to the touches associated with the touch objects 510, 512, and 514 based on the positional information and touch identification information. For example, the host 500 may cause the touch sensitive display device 200 to display an image required by the driver 100A in response to the touch identification information indicating that the touch object 510 is associated with the driver 100A. Further, the host 500 may ignore the touches associated with the touch objects 512 and 514 in response to the touch identification information indicating that the touch objects 512 and 514, are not associated with the driver 100A.

Figure 12:
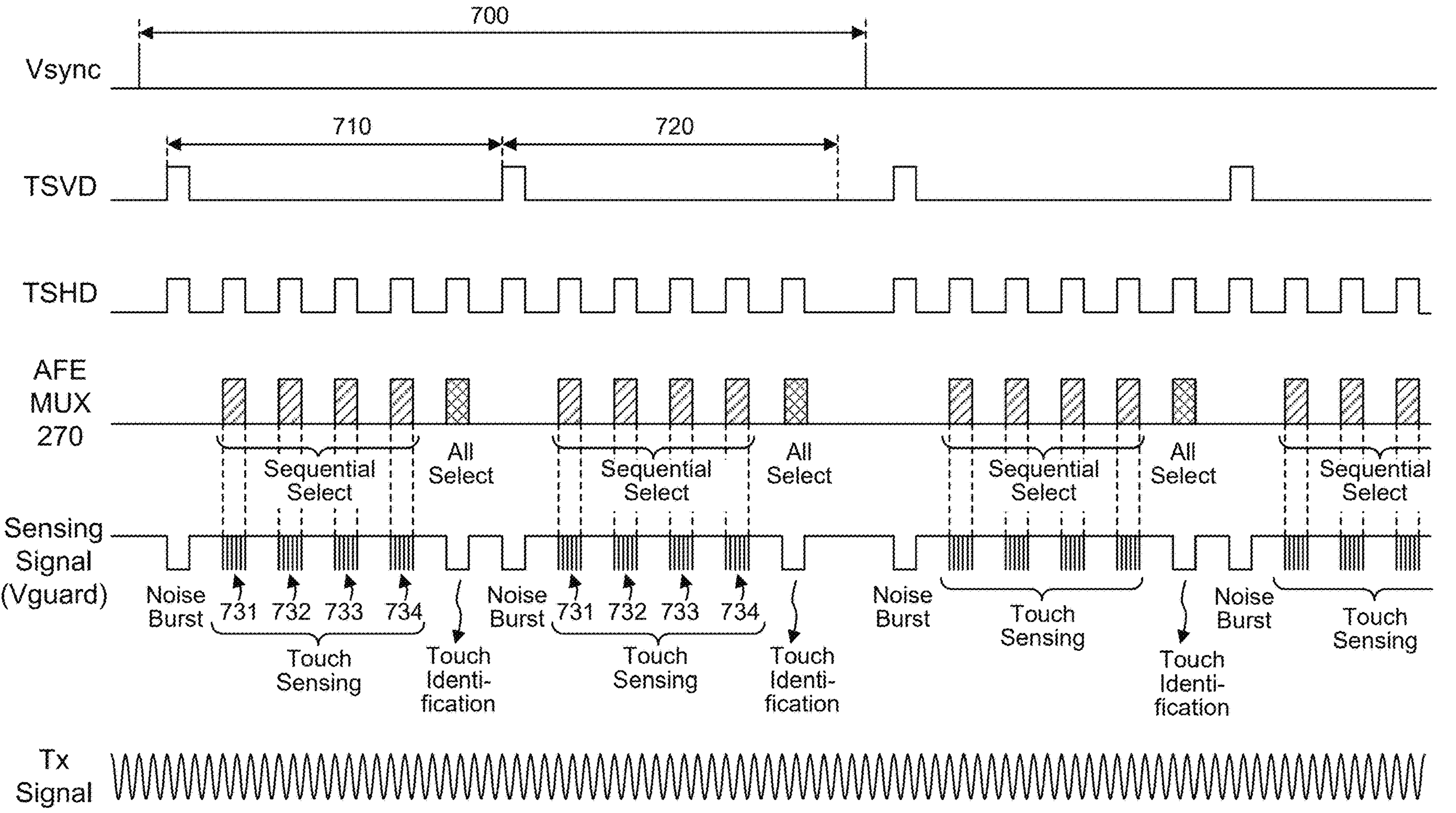
FIG. 12 shows a timing diagram showing another example operation of a touch controller during a vertical synchronization period, according to one or more embodiments.

FIG. 12 shows a timing diagram showing another example operation of the touch controller 240 during a vertical synchronization period 700, according to one or more embodiments. In the shown embodiment, the vertical synchronization period 700 includes two capacitance image frame periods 710 and 720 during each of which a capacitance image is generated with the array of sensor electrodes 215 as in the operation shown in FIG. 6. Each of the capacitance image frame periods 710 and 720 includes a noise burst phase (indicated by "Noise Burst" in FIG. 12), a touch sensing phase (indicated by "Touch Sensing"), and a touch identification phase (indicated by "Touch Identification").

The operations of the system during the noise burst phase and the touch sensing phase are the same as those described in relation to FIG. 6. During the noise burst phase, the touch controller 240 selects the frequency $f_{sense}$ of the sensing signal based on the resulting signals received from the sensor electrodes 215. During the touch sensing phase, the touch controller 240 senses one or more touch objects based on the resulting signals received from the sensor electrodes 215 while the sensing signal of the frequency $f_{sense}$ is provided to the respective AFE receivers 280. In implementations where the sensor electrodes 215 are grouped into the first to fourth sensor electrode sets 218-1 to 218-4 (see also FIG. 4), the touch sensing phase includes four sensing subphases 731, 732, 733, and 734, and the AFE multiplexer 270 is configured to sequentially select the first to fourth sensor electrode sets 218-1 to 218-4 during the sensing subphases 731, 732, 733, and 734, respectively. The AFE 250 is configured to process the resulting signals received from the first to fourth sensor electrode sets 218-1 to 218-4 to generate the AFE output data AFE_out for the first to fourth sensor electrode sets 218-1 to 218-4, respectively, during the sensing subphases 731, 732, 733, and 734, respectively. The full set of AFE output data AFE_out generated during the touch sensing phase may be provided to the processor 260 and used as the touch sensing signal data to sense one or more touch objects in the touch sensing region.

During the identification phase, the touch controller 240 identifies whether each touch object sensed during the touch sensing phase is associated with an object to which the transmitter signal 145 is applied (e.g., the driver 100A in the embodiment shown in FIG. 1). In the embodiment shown in FIG. 12, in contrast to the embodiment shown in FIG. 6, the AFE multiplexer 270 is configured to electrically connect all of the sensor electrodes 215 to the associated AFE receivers 280 during the touch identification phase so that the touch controller 240 receives the resulting signals from all of the sensor electrodes 215 simultaneously. For example, in the embodiment shown in FIG. 4, during the touch identification phase, the selector 275-1 in the AFE multiplexer 270 simultaneously electrically connects the sensor electrodes 215-1, 215-2, 215-3, and 215-4 to its associated AFE receiver 280, and the selector 275-2 simultaneously electrically connects the sensor electrodes 215-5, 215-6, 215-7, and 215-8 to its associated AFE receiver 280. The AFE 250 is configured to generate the touch identification signal data based on the resulting signals received from the sensor electrodes 215 during the touch identification phase, and the processor 260 is configured to identify, based on the touch identification signal data, whether each touch object sensed during the touch sensing phase is associated with an object to which the transmitter signal 145 is applied.

Since each AFE receiver 280 is electrically connected to multiple sensor electrodes 215 during the touch identification phase, there may be uncertainty in determining the position of a touch object sensed during the touch identification phase. In the embodiment shown in FIG. 4, for example, it may be indeterminable from the touch identification signal data which of the first to fourth sensor electrode sets 218-1 to 218-4 a touch object sensed during the touch identification phase is in the vicinity of. The touch identification signal data however contains sufficient information to identify whether a touch object sensed during the touch sensing phase is associated with an object to which the transmitter signal 145 is applied, because multiple possible positions of the touch object can be determined based on the touch identification signal data. For example, if one of the possible positions determined based on the touch identification signal data matches the position of the touch object sensed during the touch sensing phase, this means that the touch object is associated with the object to which the transmitter signal 145 is applied (e.g., the driver 100A in the embodiment shown in FIG. 1).

One advantage of the operation of the embodiment shown in FIG. 12 is that the time duration of the touch identification phase can be reduced compared to the embodiment shown in FIG. 6 because the AFE 250 processes the resulting signals received from all of the sensor electrodes 215 simultaneously. By reducing the time duration of the touch identification phase, the touch sensing rate (or the capacitance image frame rate) can be effectively increased.

Figure 13:
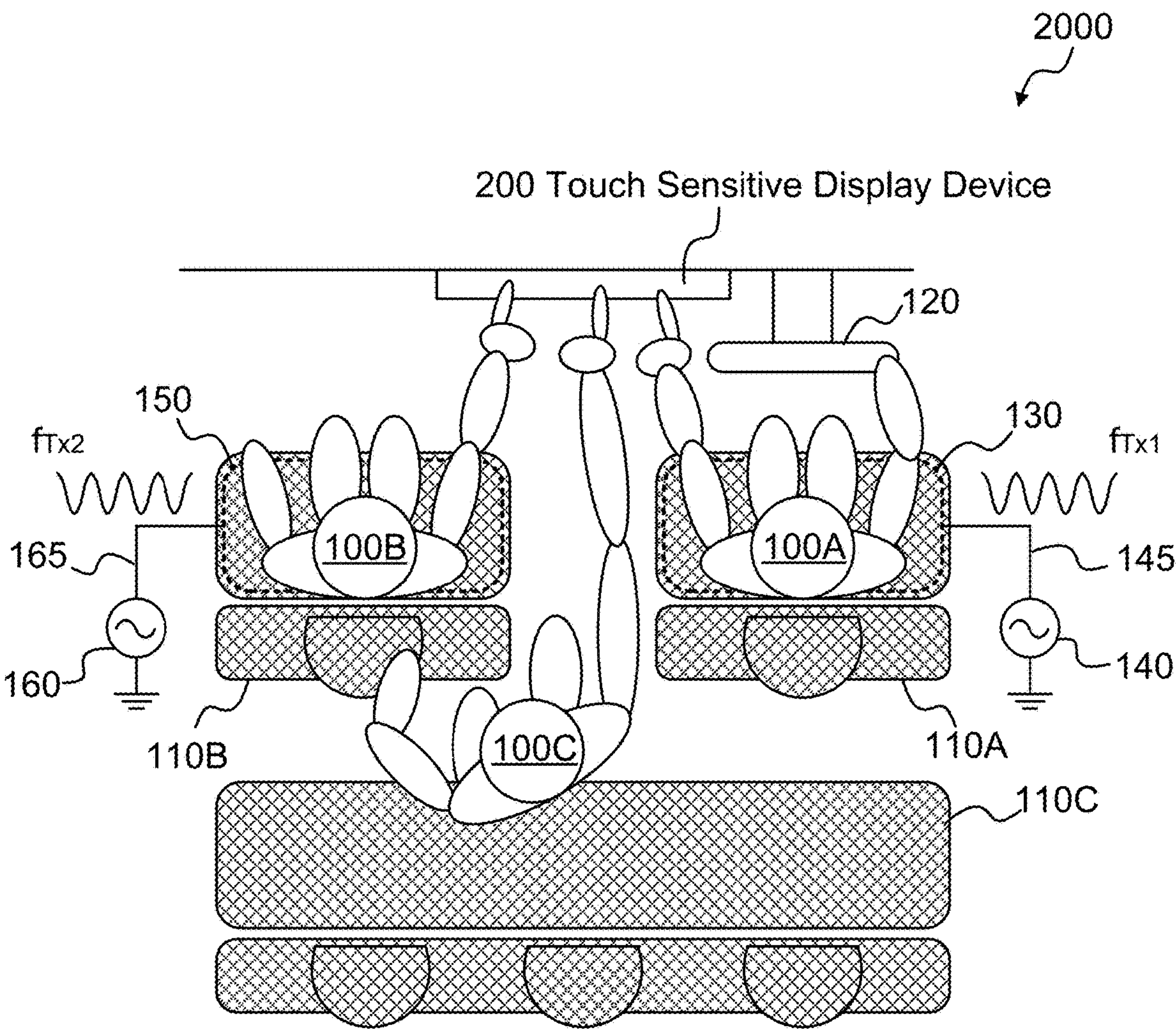
FIG. 13 shows another example environment in which a touch sensing and identification technology is used in an automotive vehicle, according to one or more embodiments.

FIG. 13 shows another example environment 2000 in which a touch sensing and identification technology is used in an automotive vehicle, according to one or more embodiments. In the shown embodiment, the touch sensitive display device 200, which may be configured as shown in FIGS. 2 to 5, is configured to identify whether each sensed touch object is associated with the driver 100A, and further to identify whether each sensed touch object is associated with the passenger 100B. The touch sensitive display device 200 is configured to achieve this identification by using a first transmitter signal 145 applied to the driver 100A by a first transmitter 140 and a second transmitter signal 165 applied to the passenger 100B by a second transmitter 160. In the shown embodiment, the second electrode 150 is embedded in the passenger seat 110B, and the second transmitter signal 165 is applied to the passenger 100B via the capacitive coupling between the second electrode 150 and the passenger 100B. The first and second transmitter signals 145 and 165 may be periodic signals (e.g., sinusoidal signals). The first transmitter signal 145 has a frequency of $f_{Tx1}$, and the second transmitter signal 165 has a frequency of $f_{Tx2}$ different from the frequency of $f_{Tx1}$. The touch sensitive display device 200 may be configured to identify whether the sensed touch object is associated with the driver 100A based on components at the frequency $f_{Tx1}$ (which may be simply referred to as $f_{Tx1}$ components, hereinafter) of the resulting signals received from the sensor electrodes, and also to identify whether the sensed touch object is associated with the passenger 100B based on components at the frequency $f_{Tx2}$ (which may be simply referred to as $f_{Tx2}$ components, hereinafter) of the resulting signals.

Figure 14:
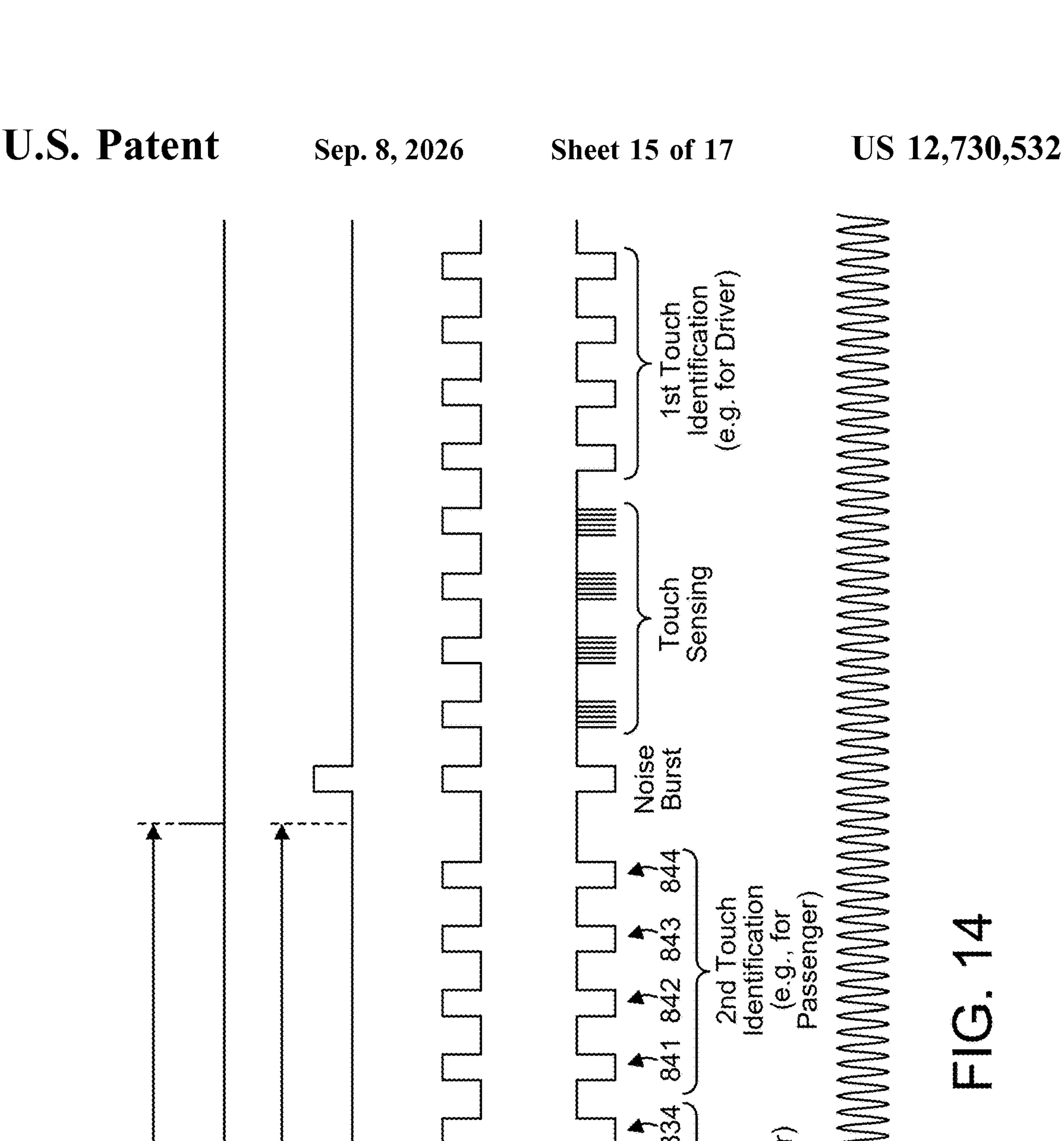
FIG. 14 is a timing diagram showing an example operation of a touch controller during a vertical synchronization period in the embodiment shown in FIG. 13.

FIG. 14 is a timing diagram showing an example operation of the touch controller 240 of the touch sensitive display device 200 during a vertical synchronization period 800 in the embodiment shown in FIG. 13. In the shown embodiment, the vertical synchronization period 800 includes one capacitance image frame period 810 during which a capacitance image is generated with the array of sensor electrodes 215. The capacitance image frame period 810 includes a noise burst phase (indicated by "Noise Burst" in FIG. 14), a touch sensing phase (indicated by "Touch Sensing"), a first touch identification phase (indicated by "1st Touch Identification"), and a second touch identification phase (indicated by "2nd Touch Identification").

The operations of the touch sensitive display device 200 during the noise burst phase and the touch sensing phase are the same as those described in relation to FIGS. 6 and 12. During the noise burst phase, the touch controller 240 selects the frequency $f_{sense}$ of the sensing signal based on the resulting signals received from the sensor electrodes 215. During the touch sensing phase, the touch controller 240 senses one or more touch objects based on the resulting signals received from the sensor electrodes 215 while the sensing signal of the frequency $f_{sense}$ is provided to the respective AFE receivers 280. In implementations where the sensor electrodes 215 are grouped into the first to fourth sensor electrode sets 218-1 to 218-4 as shown in FIG. 4, the touch sensing phase includes four sensing subphases 821, 822, 823, and 824, and the AFE multiplexer 270 is configured to sequentially select the first to fourth sensor electrode sets 218-1 to 218-4 during the sensing subphases 821, 822, 823, and 824, respectively. The AFE 250 is configured to process the resulting signals received from the first to fourth sensor electrode sets 218-1 to 218-4 to generate the AFE output data AFE_out for the first to fourth sensor electrode sets 218-1 to 218-4, respectively, during the sensing subphases 821, 822, 823, and 824, respectively. The full set of AFE output data AFE_out generated during the touch sensing phase may be provided to the processor 260 and used as the touch sensing signal data to sense one or more touch objects in the touch sensing region.

During the first touch identification phase, the touch sensitive display device 200 identifies whether each touch object sensed during the touch sensing phase is associated with an object to which the first transmitter signal 145 is applied (e.g., the driver 100A in the embodiment shown in FIG. 13). The operation during the first touch identification phase is similar to the operation during the touch identification phase shown in FIG. 6. In one or more embodiments, the AFE 250 causes the sensing signal generator 300 to generate the sensing signal with a DC waveform, while adjusting the frequencies of the I clock signal MIX_CLK_I and the Q clock signal MIX_CLK_Q used in the AFE receivers 280 to be equal to the frequency $f_{Tx1}$ of the first transmitter signal 145. This allows the touch controller 240 to identify, based on the $f_{Tx1}$ components of the resulting signals received from the sensor electrodes 215, whether each touch object sensed during the touch sensing phase is associated with an object to which the first transmitter signal 145 is applied. In one or more embodiments, the AFE 250 is configured to generate first touch identification signal data based on the resulting signals received from the sensor electrodes 215 during the first touch identification phase, and the processor 260 is configured to identify, based on the first touch identification signal data, whether each touch object sensed during the touch sensing phase is associated with the object to which the transmitter signal 145 is applied. In implementations where the sensor electrodes 215 are grouped into the first to fourth sensor electrode sets 218-1 to 218-4 (see also FIG. 4), the touch identification phase may include four identification subphases 831, 832, 833, and 834. The AFE 250 may be configured to process the resulting signals received from the first to fourth sensor electrode sets 218-1 to 218-4 to generate the AFE output data AFE_out for the first to fourth sensor electrode sets 218-1 to 218-4, respectively, during the identification subphases 831, 832, 833, and 834, respectively. The full set of AFE output data AFE_out generated during the sensing subphases 831, 832, 833, and 834 may be provided to the processor 260 and used as the first touch identification signal data to identify whether each touch object sensed during the touch sensing phase is associated with the object to which the first transmitter signal 145 is applied.

During the second touch identification phase, the touch sensitive display device 200 identifies whether each touch object sensed during the touch sensing phase is associated with an object to which the second transmitter signal 165 is applied (e.g., the passenger 100B in the embodiment shown in FIG. 13). In one or more embodiments, the AFE 250 causes the sensing signal generator 300 to generate the sensing signal with a DC waveform, while adjusting the frequencies of the I clock signal MIX_CLK_I and the Q clock signal MIX_CLK_Q used in the AFE receivers 280 to be equal to the frequency $f_{Tx2}$ of the second transmitter signal 165. This allows the touch controller 240 to identify, based on the $f_{Tx2}$ components of the resulting signals received from the sensor electrodes 215, whether each touch object sensed during the touch sensing phase is associated with an object to which the second transmitter signal 165 is applied. In one or more embodiments, the AFE 250 is configured to generate second touch identification signal data based on the resulting signals received from the sensor electrodes 215 during the second touch identification phase, and the processor 260 is configured to identify, based on the second touch identification signal data, whether each touch object sensed during the touch sensing phase is associated with the object to which the transmitter signal 145 is applied. In implementations where the sensor electrodes 215 are grouped into the first to fourth sensor electrode sets 218-1 to 218-4 (see also FIG. 4), the second touch identification phase may include four identification subphases 841, 842, 843, and 844. The AFE 250 may be configured to process the resulting signals received from the first to fourth sensor electrode sets 218-1 to 218-4 to generate the AFE output data AFE_out for the first to fourth sensor electrode sets 218-1 to 218-4, respectively, during the identification subphases 841, 842, 843, and 844, respectively. The full set of AFE output data AFE_out generated during the second touch identification phase may be provided to the processor 260 and used as the second touch identification signal data to identify whether each touch object sensed during the touch sensing phase is associated with the object to which the second transmitter signal 165 is applied.

Figure 15:
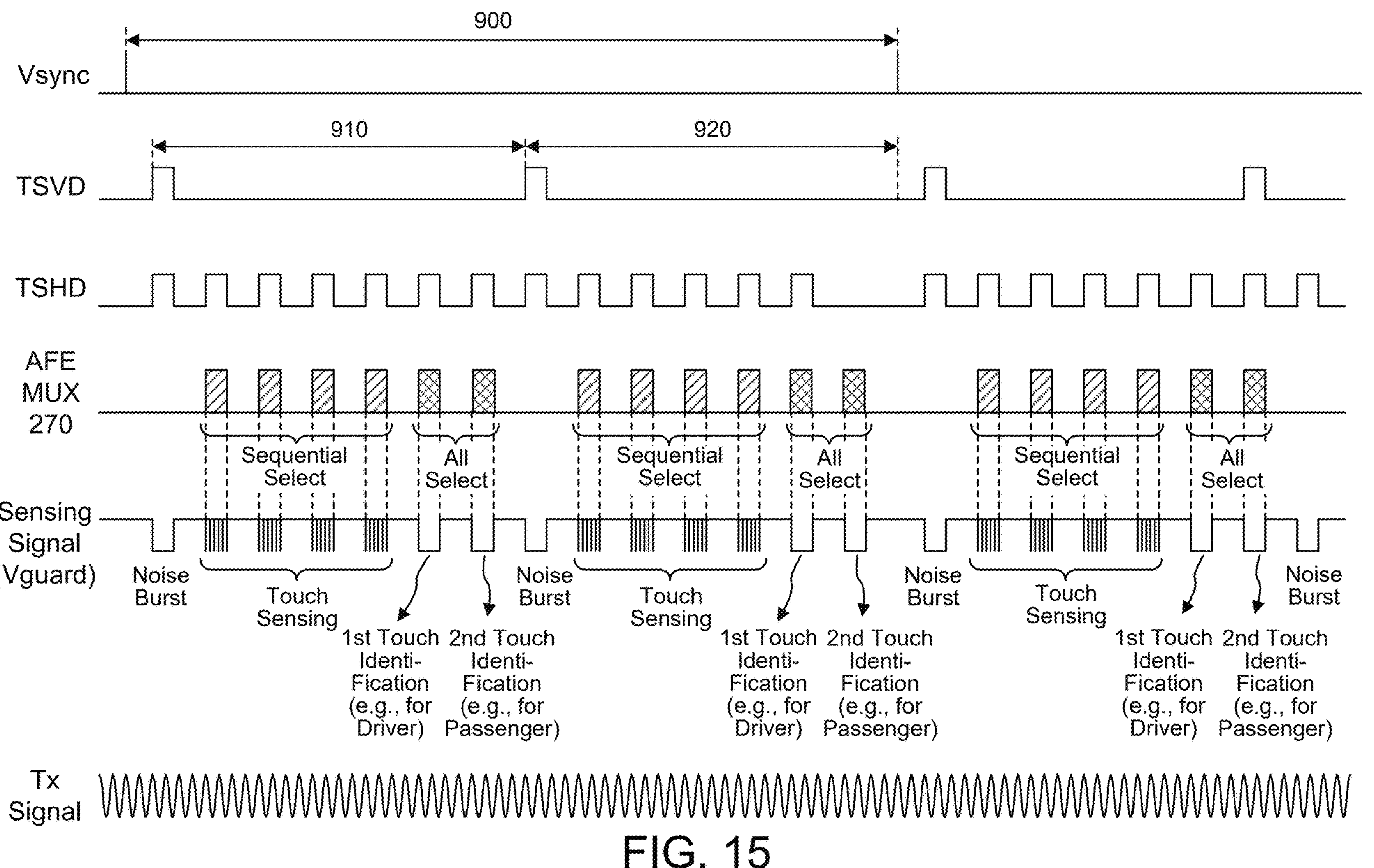
FIG. 15 a timing diagram showing another example operation of a touch controller during a vertical synchronization period in the embodiment shown in FIG. 13.

FIG. 15 shows a timing diagram showing another example operation of the touch controller 240 of the touch sensitive display device 200 during a vertical synchronization period 900 in the embodiment shown in FIG. 13. In the shown embodiment, the vertical synchronization period 900 includes two capacitance image frame periods 910 and 920 during each of which a capacitance image is generated with the array of sensor electrodes 215. Each of the capacitance image frame periods 910 and 920 includes a noise burst phase (indicated by "Noise Burst" in FIG. 15), a touch sensing phase (indicated by "Touch Sensing"), a first touch identification phase (indicated by "1st Touch Identification"), and a second touch identification phase (indicated by "2nd Touch Identification") as in the embodiment shown in FIG. 14. The operations of the touch controller 240 during the noise burst phase and the touch sensing phase are the same as those described in relation to FIGS. 6, 12, and 14. During the noise burst phase, the touch controller 240 selects the frequency $f_{sense}$ of the sensing signal based on the resulting signals received from the sensor electrodes 215. During the touch sensing phase, the touch controller 240 senses one or more touch objects based on the resulting signals received from the sensor electrodes 215 while the sensing signal of the frequency $f_{sense}$ is provided to the respective AFE receivers 280. During the first touch identification phase, the touch sensitive display device 200 identifies, whether each touch object sensed during the touch sensing phase is associated with an object to which the first transmitter signal 145 is applied (e.g., the driver 100A in the embodiment shown in FIG. 13). During the second touch identification phase, the touch sensitive display device 200 identifies whether each touch object sensed during the touch sensing phase is associated with an object to which the second transmitter signal 165 is applied (e.g., the passenger 100B in the embodiment shown in FIG. 13).

In the embodiment shown in FIG. 15, as in the embodiment shown in FIG. 12, the AFE multiplexer 270 is configured to electrically connect all of the sensor electrodes 215 to the associated AFE receivers 280 during the first touch identification phase and the second touch identification phase, allowing the touch controller 240 to simultaneously receive the resulting signals from all the sensor electrodes 215. In implementations shown in FIG. 4, for example, during the first and second touch identification phases, the selector 275-1 in the AFE multiplexer 270 simultaneously electrically connects the sensor electrodes 215-1, 215-2, 215-3, and 215-4 to its associated AFE receiver 280, and the selector 275-2 simultaneously electrically connects the sensor electrodes 215-5, 215-6, 215-7, and 215-8 to its associated AFE receiver 280. The AFE 250 is configured to generate first touch identification signal data based on the resulting signals received from the sensor electrodes 215 during the first touch identification phase, and the processor 260 is configured to identify, based on the first touch identification signal data, whether each touch object sensed during the touch sensing phase is associated with an object to which the first transmitter signal 145 is applied. The AFE 250 is further configured to generate second touch identification signal data based on the resulting signals received from the sensor electrodes 215 during the second touch identification phase, and the processor 260 is configured to identify, based on the second touch identification signal data, whether each touch object sensed during the touch sensing phase is associated with an object to which the second transmitter signal 165 is applied.

One advantage of the operation of the embodiment shown in FIG. 15 is that the time duration of the first and second touch identification phases can be reduced as compared to the embodiment shown in FIG. 14, because the AFE 250 processes the resulting signals received from all of the sensor electrodes 215 simultaneously. By reducing the time duration of the first and second touch identification phases, the touch sensing rate (or the capacitance image frame rate) can be effectively increased.

Figure 16:
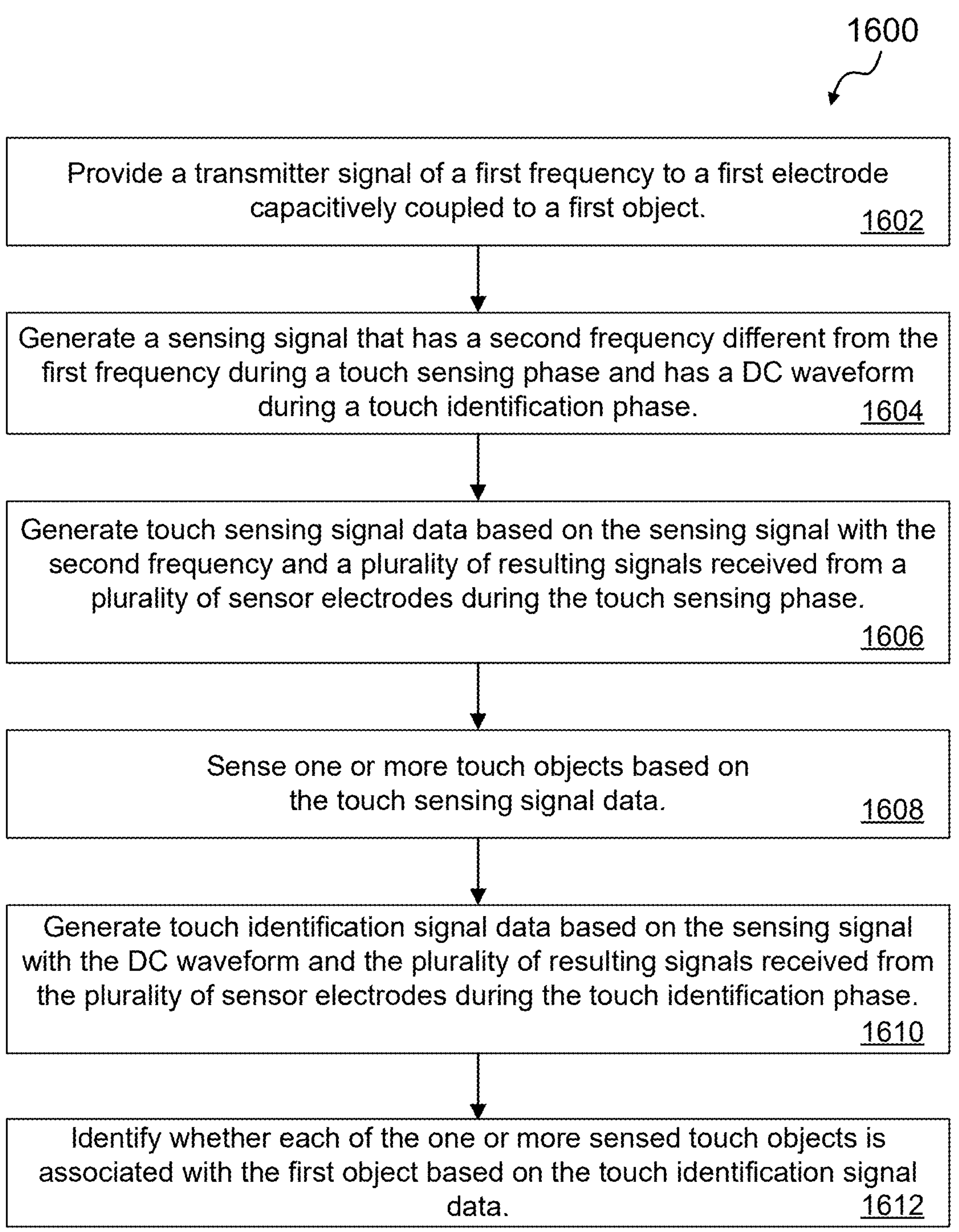
FIG. 16 is a flowchart showing an exemplary process for touch sensing, according to one or more embodiments.

FIG. 16 is a flowchart showing an exemplary process 1600 for touch sensing, according to one or more embodiments. The process 1600 may be performed by any suitable touch sensing system. Non-limiting examples include any of the environments 1000 and 2000 shown in FIGS. 1 and 13, particularly in the touch controller 240 shown in FIGS. 2 to 5. However, it will be appreciated that a display device that includes additional and/or fewer components than those shown in FIGS. 1 to 5, and 13 may be used to perform the process 1600, that any of the following steps may be performed in any suitable order, and that the process 1600 may be performed in any suitable environment.

The process 1600 includes providing a transmitter signal (e.g., the transmitter signal 145 shown in FIGS. 1 and 13) of a first frequency to a first electrode (e.g., the electrode 130) capacitively coupled to a first object (e.g., the driver 100A shown in FIGS. 1 and 13) (1602). The process 1600 further includes generating a sensing signal that has a second frequency different from the first frequency during a touch sensing phase and has a DC waveform during a touch identification phase (1604). The process 1600 further includes generating touch sensing signal data based on the sensing signal with the second frequency and a plurality of resulting signals received from a plurality of sensor electrodes (e.g., the sensor electrodes 215 shown in FIGS. 2 to 5) during the touch sensing phase (1606). The process 1600 further includes sensing one or more touch objects (e.g., the touch objects 510, 512, and 514 shown in FIG. 11) based on the touch sensing signal data (1608). The process 1600 further includes generating touch identification signal data based on the sensing signal with the DC waveform and the plurality of resulting signals received from the plurality of sensor electrodes during the touch identification phase (1610). The process 1600 further includes identifying whether each of the one or more sensed touch objects is associated with the first object based on the touch identification signal data (1612).

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system, comprising:

a plurality of sensor electrodes;

a first transmitter configured to provide a first transmitter signal of a first frequency to a first electrode capacitively coupled to a first object; and a touch controller configured to:

generate a sensing signal that has a second frequency different from the first frequency during a touch sensing phase and has a direct current (DC) waveform during a touch identification phase, wherein the touch sensing phase is temporally distinct from the touch identification phase;

generate touch sensing signal data based on the sensing signal with the second frequency and a plurality of resulting signals received from the plurality of sensor electrodes during the touch sensing phase;

sense one or more touch objects based on the touch sensing signal data;

generate touch identification signal data based on the sensing signal with the DC waveform and the plurality of resulting signals received from the plurality of sensor electrodes during the touch identification phase; and identify whether each of the one or more sensed touch objects is associated with the first object based on the touch identification signal data.

2. The system of claim 1, wherein sensing the one or more touch objects comprises generating positional information of the one or more touch objects based on the touch sensing signal data.

3. The system of claim 1, wherein the touch controller comprises an operational amplifier integrator having a first input configured to receive the sensing signal and a second input configured to receive a first resulting signal of the plurality of resulting signals from a first sensor electrode of the plurality of sensor electrodes, wherein the touch controller is configured to generate touch identification signal data associated with the first sensor electrode based on an output signal of the operational amplifier integrator during the touch identification phase.

4. The system of claim 3, wherein the touch controller further comprises a mixer configured to mix the output signal of the operational amplifier integrator with a mixer clock signal, wherein generating the touch identification signal data associated with the first sensor electrode is based on an output of the mixer during the touch identification phase, wherein the first transmitter signal is asynchronous with the mixer clock signal at least during the touch identification phase.

5. The system of claim 4, wherein the touch controller is configured to generate touch sensing signal data associated with the first sensor electrode based on the output of the operational amplifier integrator during the touch sensing phase.

6. The system of claim 1, wherein the touch identification signal data comprises:

a first portion corresponding to in-phase (I) components of a first set of resulting signals of the plurality of resulting signals received during the touch identification phase; and a second portion corresponding to a quadrature (Q) component of a second set of resulting signals of the plurality of resulting signals received during the touch identification phase, wherein identifying whether each of the one or more sensed touch objects is associated with the first object is based on the first and second portions of the touch identification signal data.

7. The system of claim 6, wherein the first set of resulting signals are received from a first set of sensor electrodes of the plurality of sensor electrodes, wherein the second set of resulting signals are received from a second set of sensor electrodes of the plurality of sensor electrodes, and wherein the first set of sensor electrodes and the second set of sensor electrodes are arranged in a checkered pattern.

8. The system of claim 6, wherein the touch sensing signal data correspond to I components of the plurality of resulting signals received during the touch sensing phase.

9. The system of claim 1, wherein the touch controller comprises:

an analog front end receiver; and a multiplexer coupled between the analog front end receiver and a first set of sensor electrodes of the plurality of sensor electrodes;

wherein the multiplexer is configured to:

during the touch sensing phase, sequentially connect the first set of sensor electrodes to the analog front end receiver; and during the touch identification phase, connect all of the first set of sensor electrodes to the analog front end receiver, wherein the touch sensing signal data for the first set of sensor electrodes is generated based on an output of the analog front end receiver during the touch sensing phase, and wherein the touch identification signal data for the first set of sensor electrodes is generated based on the output of the analog front end receiver during the touch identification phase.

10. The system of claim 1, further comprising a second transmitter configured to provide a second transmitter signal of a third frequency to a second electrode capacitively coupled to a second object during a second touch identification phase, the third frequency being different from the first frequency and the second frequency, and wherein the touch controller is further configured to:

generate second touch identification signal data based on the sensing signal with the DC waveform and the plurality of resulting signals received from the plurality of sensor electrodes during the second touch identification phase; and identify whether each of the one or more sensed touch objects is associated with the second object based on the second touch identification signal data.

11. A touch controller for use in a system that comprises a transmitter configured to provide a first transmitter signal of a first frequency to a first electrode capacitively coupled to a first object, the touch controller comprising:

a sensing signal generator configured to generate a sensing signal that has a second frequency different from the first frequency during a touch sensing phase and has a direct current (DC) waveform during a touch identification phase, wherein the touch sensing phase is temporally distinct from the touch identification phase;

an analog front end configured to:

generate touch sensing signal data based on the sensing signal with the second frequency and a plurality of resulting signals received from a plurality of sensor electrodes during the touch sensing phase; and generate touch identification signal data based on the sensing signal with the DC waveform and the plurality of resulting signals received from the plurality of sensor electrodes during the touch identification phase, and a processor configured to:

sense one or more touch objects based on the touch sensing signal data; and identify whether each of the one or more sensed touch objects is associated with the first object based on the touch identification signal data.

12. The touch controller of claim 11, wherein detecting the one or more touch objects comprises generating positional information of the one or more touch objects based on the touch sensing signal data.

13. The touch controller of claim 11, wherein the analog front end comprises an operational amplifier integrator having a first input configured to receive the sensing signal and a second input configured to receive a first resulting signal of the plurality of resulting signals from a first sensor electrode of the plurality of sensor electrodes, wherein the analog front end is configured to generate touch identification signal data associated with the first sensor electrode based on an output of the operational amplifier integrator during the touch identification phase.

14. The touch controller of claim 13, wherein the analog front end is further configured to generate touch sensing signal data associated with the first sensor electrode based on the output of the operational amplifier integrator during the touch sensing phase.

15. The touch controller of claim 11, wherein the touch identification signal data comprises:

first touch identification signal data corresponding to in-phase (I) components of a first set of resulting signals of the plurality of resulting signals received during the touch identification phase; and second touch identification signal data corresponding to a quadrature (Q) component of a second set of resulting signals of the plurality of resulting signals received during the touch identification phase, wherein identifying whether each of the one or more sensed touch objects is associated with the first object is based on the first touch identification signal data and the second touch identification signal data.

16. The touch controller of claim 15, wherein the first set of resulting signals are received from a first set of sensor electrodes of the plurality of sensor electrodes, wherein the second set of resulting signals are received from a second set of sensor electrodes of the plurality of sensor electrodes, and wherein the first set of second sensor electrodes and the second set of sensor electrodes are arranged in a checkered pattern.

17. The touch controller of claim 15, wherein the touch sensing signal data correspond to I components of the plurality of resulting signals received during the touch sensing phase.

18. A method, comprising:

providing a transmitter signal of a first frequency to a first electrode capacitively coupled to a first object; and generating a sensing signal that has a second frequency different from the first frequency during a touch sensing phase and has a direct current (DC) waveform during a touch identification phase, wherein the touch sensing phase is temporally distinct from the touch identification phase;

generating touch sensing signal data based on the sensing signal with the second frequency and a plurality of resulting signals received from a plurality of sensor electrodes during the touch sensing phase;

sensing one or more touch objects based on the touch sensing signal data;

generating touch identification signal data based on the sensing signal with the DC waveform and the plurality of resulting signals received from the plurality of sensor electrodes during the touch identification phase; and identifying whether each of the one or more sensed touch objects is associated with the first object based on the touch identification signal data.

19. The method of claim 18, wherein detecting the one or more touch objects comprises generating positional information of the one or more touch objects based on the touch sensing signal data.

20. The method of claim 18, wherein the touch identification signal data comprises:

first touch identification signal data corresponding to in-phase (I) components of a first set of resulting signals of the plurality of resulting signals received during the touch identification phase; and second touch identification signal data corresponding to a quadrature (Q) component of a second set of resulting signals of the plurality of resulting signals received during the touch identification phase, wherein identifying whether each of the one or more sensed touch objects is the first object is based on the first touch identification signal data and the second touch identification signal data.

* * * * *